(12) United States Patent
Fortmann

(10) Patent No.: US 11,971,259 B2
(45) Date of Patent: Apr. 30, 2024

(54) SYSTEM AND METHOD FOR CONTEXTUALIZING OBJECTS IN A VEHICLE HORIZON

(71) Applicant: Harman International Industries, Incorporated, Stamford, CT (US)

(72) Inventor: Gustavo Adolfo Fortmann, Novi, MI (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 760 days.

(21) Appl. No.: 17/052,774

(22) PCT Filed: May 4, 2018

(86) PCT No.: PCT/US2018/031243
§ 371 (c)(1),
(2) Date: Nov. 3, 2020

(87) PCT Pub. No.: WO2019/212574
PCT Pub. Date: Nov. 7, 2019

(65) Prior Publication Data
US 2021/0231441 A1     Jul. 29, 2021

(51) Int. Cl.
*G01C 21/30*     (2006.01)
*G06T 7/70*     (2017.01)
(Continued)

(52) U.S. Cl.
CPC ............ *G01C 21/30* (2013.01); *G06V 20/58* (2022.01); *G06V 20/588* (2022.01);
(Continued)

(58) Field of Classification Search
CPC .... G01C 21/30; G01C 21/3602; G06V 20/58; G06V 20/588; G06V 20/56; G05D 1/0231;
(Continued)

(56) References Cited

U.S. PATENT DOCUMENTS

| | | |
|---|---|---|
| 2002/0161513 A1 | 10/2002 | Bechtolsheim et al. |
| 2015/0153197 A1 | 6/2015 | Denaro |

(Continued)

FOREIGN PATENT DOCUMENTS

DE     102014204383 A1     9/2015

OTHER PUBLICATIONS

ISA United States Patent and Trademark Office, International Search Report and Written Opinion Issued in Application No. PCT/US2018/031243, dated Jul. 19, 2018, WIPO, 7 pages.
(Continued)

*Primary Examiner* — Manish S Shah
*Assistant Examiner* — Christian T Bryant
(74) *Attorney, Agent, or Firm* — McCoy Russell LLP

(57) ABSTRACT

The present disclosure relates to systems, devices and methods for contextualizing objects relative to a vehicle horizon. In one embodiment, a method is provided including identifying a vehicle horizon based on vehicle trajectory and roadway data relative to the vehicle position and vehicle trajectory. The vehicle horizon is identified to determine at least one roadway segment. Objects relative to the vehicle may be identified and assigned to a roadway segment. Objects may be contextualized by assigning only objects that are associated with the vehicles horizon. Each object assigned to a roadway segment is assigned based on the vehicle horizon. The method may include monitoring each object assigned to a roadway segment associated with the vehicle horizon. By monitoring assigned objects, objects of
(Continued)

little to no consequence to the vehicle can be ignored and computing resources of the vehicle may not be wasted on tracking objects of no interest.

18 Claims, 13 Drawing Sheets

(51) Int. Cl.
*G06V 20/56* (2022.01)
*G06V 20/58* (2022.01)
*G01C 21/36* (2006.01)
*G05D 1/00* (2006.01)
*G08G 1/16* (2006.01)

(52) U.S. Cl.
CPC ....... *G01C 21/3602* (2013.01); *G05D 1/0231* (2013.01); *G06T 7/70* (2017.01); *G06T 2207/30252* (2013.01); *G06T 2207/30256* (2013.01); *G06T 2207/30261* (2013.01); *G06V 20/56* (2022.01); *G08G 1/165* (2013.01); *G08G 1/166* (2013.01)

(58) Field of Classification Search
CPC ........... G05D 2201/0213; G08G 1/166; G08G 1/165; G06T 2207/30252; G06T 2207/30256; G06T 2207/30261; G06T 7/70

See application file for complete search history.

(56) References Cited

U.S. PATENT DOCUMENTS

| | | | |
|---|---|---|---|
| 2016/0288709 A1 | 10/2016 | Nespolo et al. | |
| 2017/0001564 A1 | 1/2017 | Bollea et al. | |
| 2017/0329332 A1* | 11/2017 | Pilarski | B60W 30/095 |
| 2018/0005052 A1 | 1/2018 | Browning et al. | |
| 2019/0025841 A1* | 1/2019 | Haynes | G05D 1/0214 |

OTHER PUBLICATIONS

International Bureau of WIPO, International Preliminary Report on Patentability Issued in Application No. PCT/US2018/031243, dated Nov. 10, 2020, WIPO, 6 pages.

Baek, I. et al., "Real-time Detection, Tracking, and Classification of Moving and Stationary Objects using Multiple Fisheye Images," Proceedings of the 2018 IEEE Intelligent Vehicles Symposium (IV), Jun. 26, 2018, Changshu, China, 6 pages.

European Patent Office, Extended European Search Report Issued in Application No. 18917149.9, dated Dec. 17, 2021, Germany, 9 pages.

* cited by examiner

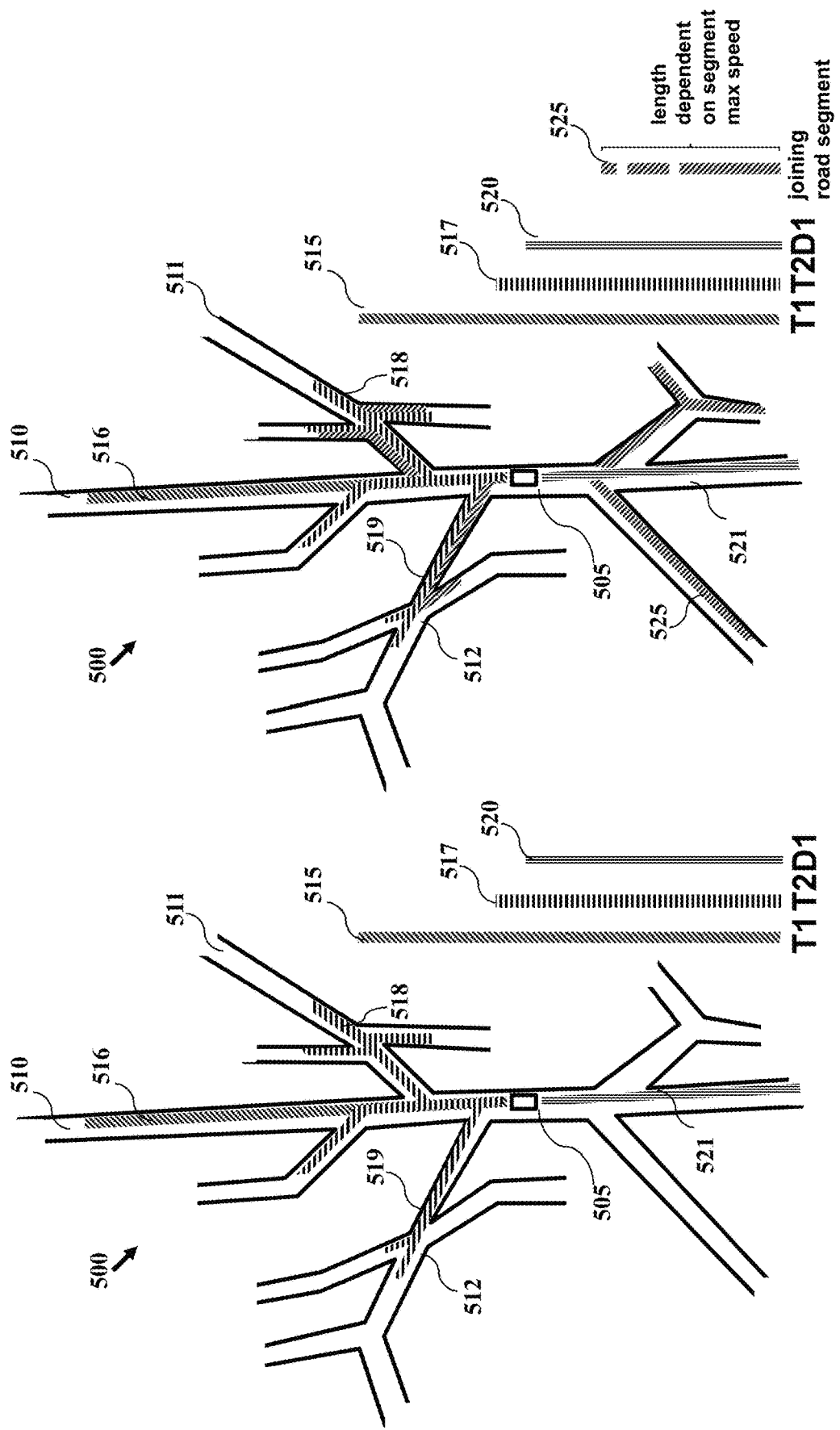

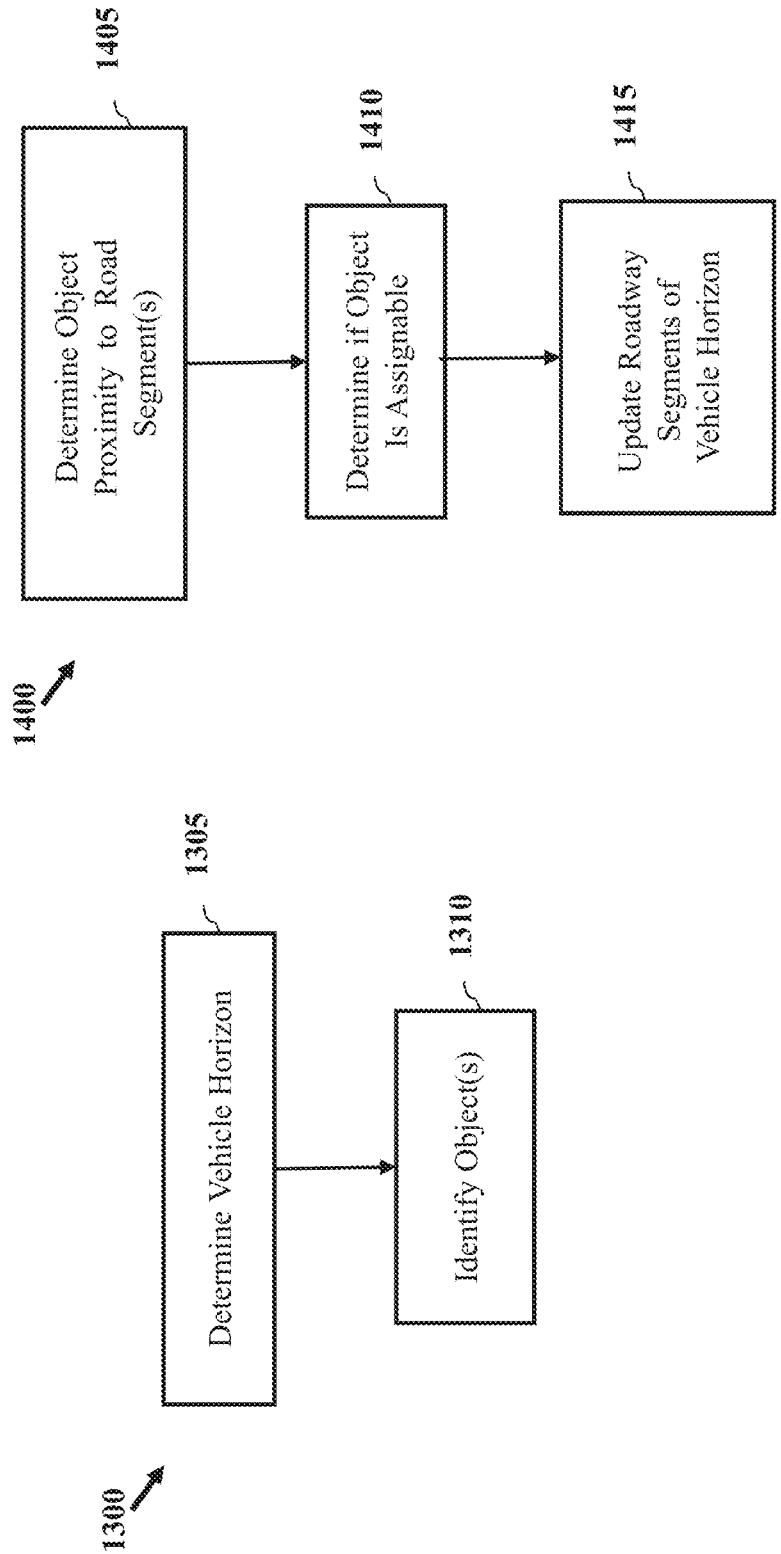

SYSTEM AND METHOD FOR CONTEXTUALIZING OBJECTS IN A VEHICLE HORIZON

CROSS-REFERENCE TO RELATED APPLICATIONS

The present application is a U.S. National Phase of International Patent Application Serial No. PCT/US2018/031243 entitled "SYSTEM AND METHOD FOR CONTEXTUALIZING OBJECTS IN A VEHICLE HORIZON," and filed on May 4, 2018. The entire contents of the above-referenced application are hereby incorporated by reference for all purposes.

FIELD

The present disclosure relates to systems, methods and devices for vehicle control, and more particularly to the contextualization of objects for vehicle operation and control.

BACKGROUND

There is a continuing desire to reduce the weight, power consumption, size and cost of electronic products for road-vehicle applications while maintaining performance. Typically, the above mentioned parameters are directly affected by the efficiency of the algorithms that run in such products and by the size of the data that such algorithms must process per unit of time. There exists the desire for vehicle components and configurations that operate more efficiently by limiting processing effort due to objects that have a low likelihood of affecting vehicle operation.

Conventional object detection systems may utilize a predefined radius to establish which objects are of interest to a vehicle. In a method analogous to using a round "cookie cutter" the conventional method will remove any objects beyond a defined distance to the vehicle, in all directions. In many instances, some objects selected in this fashion are of little to no use to the vehicle. By way of example, a first vehicle traveling on an overpass, may be detected by a second vehicle traveling on a separate roadway under the overpass, but the second vehicle does not need to track the first vehicle because there is little effect the first vehicle can have on the second vehicle. However, because conventional systems often utilize a predefined radius for establishing the relevance of detected objects, vehicles or other objects which are located on another or unconnected roadway can appear as important and require the same computational resources as objects that are truly relevant. Similarly, existing systems may be configured to operate in response to detection of a person, or group of people which may be near a roadway, but having little consequence. By way of example, people on an overhead pedestrian crosswalk may appear to be within a vehicles direction of travel. For at least these reasons, conventional methods of object relevance classification can result in use of computational resources for objects which do not affect a vehicle.

Conventional systems typically utilize electronic horizons in human operated vehicles by considering only the roadways in the forward direction of travel. These systems are not used to determine the relevance of moving objects to the vehicle and even less so to reduce computational resources in processing objects. There is a desire for systems, methods and device which allow for operations which overcome one or more of the aforementioned drawbacks. There also exists a desire for system, methods and devices that allow for contextualization of objects, stationary or moving, to roadways.

BRIEF SUMMARY OF THE EMBODIMENTS

Disclosed and claimed herein are methods, devices and systems for contextualizing objects for vehicle operation and control. One embodiment is directed to a method including identifying, by a control unit of a vehicle, a vehicle horizon based on vehicle trajectory and roadway data relative to the vehicle position, wherein identifying the vehicle horizon includes determining at least one roadway segment based on the roadway data and vehicle trajectory. The method also includes identifying, by the control unit, at least one object relative to the vehicle, and assigning, by the control unit, an object identified by the control unit to a roadway segment, wherein each object assigned to a roadway segment is assigned based on the vehicle horizon. The method also includes monitoring, by the control unit, each object assigned to a roadway segment associated with the vehicle horizon.

In one embodiment, the vehicle horizon relates to a current roadway of the vehicle and roadway path relative to the current roadway within a predefined area of the vehicle and based on the vehicle trajectory.

In one embodiment, each roadway segment relates to a section of a roadway identified by the control unit, wherein each roadway segment is determined based on vehicle operating characteristics.

In one embodiment, the vehicle horizon is determined based on a forward looking trajectory of the vehicle for the current roadway and roadways that merge into the current roadway.

In one embodiment, the vehicle horizon is determined based on a forward looking trajectory of the vehicle and for intersecting roadway paths approaching the vehicle.

In one embodiment, identifying at least object includes detecting at least one object by a sensor of the vehicle, wherein object location is detected relative to the vehicle.

In one embodiment, identifying at least object includes receiving at least one object from at least one of another vehicle and a communication network, wherein location data for the at least one object is received.

In one embodiment, assigning an object identified by the control unit to a roadway segment includes associating the object to a segment when the object is associated with the vehicle horizon of the vehicle.

In one embodiment, assigning an object identified by the control unit to a roadway segment is based on a linear distance that is determined using a comfortable stopping distance for the vehicle.

In one embodiment, monitoring includes tracking object position for objects within the vehicle horizon.

One embodiment is directed to a vehicle control unit including a vehicle trajectory module configured to identify a vehicle electronic horizon based on the vehicle trajectory and roadway data relative to the vehicle position, wherein identifying the vehicle horizon includes determining at least one roadway segment based on the roadway data. The vehicle control unit also includes an object detection module configured to identify at least one object relative to the vehicle and assign an object identified by the control unit to a roadway segment, wherein each object assigned to a roadway segment is assigned based on the vehicle horizon.

The vehicle control unit is also configured to monitor each object assigned to a roadway segment associated with the vehicle horizon.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 5A-D depict graphical representations of vehicle horizon according to one or more embodiments.

FIG. 13 depicts a process for determining objects according to one or more embodiments; and FIG. 14 depicts a process for assigning objects according to one or more embodiments.

DETAILED DESCRIPTION OF THE EXEMPLARY EMBODIMENTS

Overview and Terminology

Figure 2:
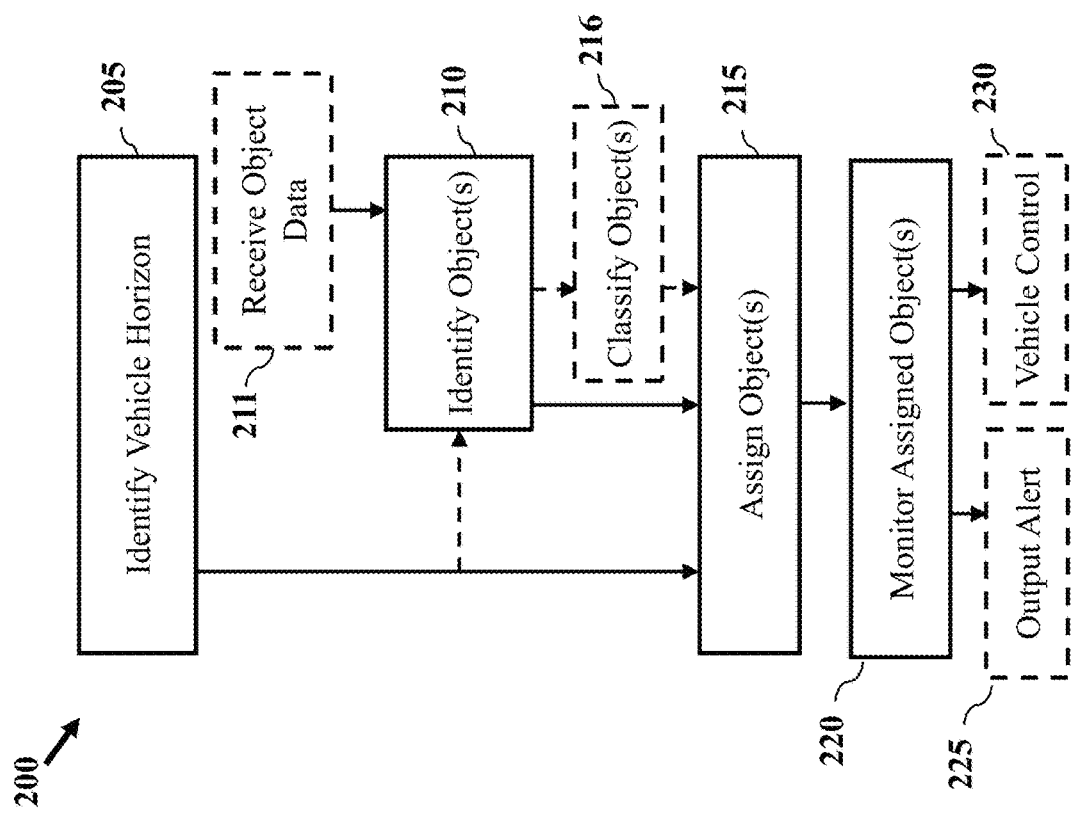
FIG. 2 depicts a process for contextualizing objects according to one or more embodiments.

One aspect of the disclosure is directed to identifying objects for vehicle systems such as autonomously driven vehicles (e.g. on-road) and driver assistance systems such as advanced driver assistant systems (ADAS).

Embodiments are directed to systems, methods and devices for determining objects relative to a vehicle horizon. As will be discussed herein, principles of the disclosure allow for a vehicle to utilize a selection of identified objects which may affect the vehicle. Systems, device configurations and processes are provided to identify objects for a vehicle. Sensors available to a road-vehicle may detect a large number of objects, not all of the objects are necessarily of interest to the vehicle. Similarly sensors of other vehicles in the road infrastructure may detect objects which are then transmitted to the vehicle and become part of the vehicle's object knowledge. If the object has little to no near-team influence on vehicle trajectory, then detecting, identifying, tracking an consequently considering the object in the vehicle's trajectory would consume valuable computer resources which may affect the performance of the system as a whole. The disclosure is directed to contextualizing objects to the road topography that is of interest to the ego vehicle. Objects that are determined to be of less importance or that cannot not be assigned to a road topography may be of less importance. Objects of less importance may still be tracked to eventually become part of the roadway topography. Systems, device configurations and processes are provided to reduce the number of objects (e.g., data) which must be processed by contextualizing the objects to a roadway. Roadway topography (e.g., road layout, type, neighboring roads, etc.) may be considered when identifying objects. Object identification and handling may include categorizing objects as more or less relevant to a vehicle.

Processes and device configurations can overcome issues presented from proximate remoteness, such as detection of objects that are close or within a detection range, and that have little to no consequence to a vehicle. For example, some vehicles detected nearby may be irrelevant, even if proximate, when the detected vehicles are traveling on an under pass or entirely different roadway. Similar issues may be presented for situations of bridges with parallel roadways where a vehicle on separate bridge unit is proximate, but unlikely to interfere. One of ordinary skill in the art would recognize that road based vehicles would have little to no change of leaving one bridge span for another. Proximate remoteness may also be present for people or pedestrians on a highway overpass. With multiple persons detected, a vehicle may require elevated processing power. For persons on the bridge overpass, the processing person to track the people is not needed.

One aspect of the disclosure is directed to identifying objects for a vehicle. Unlike traditional methods that may use geometrical shapes (e.g., rectangles or ovals) to select the objects considered of relevance in the proximity of the vehicle, embodiments are directed to selection of objects without using a predefined shape. According to one embodiment, selection of relevant objects is based on using a dynamically created shape which approximately conforms to the shape of the "roadways of interest" to the vehicle. The determination of "roadways of interest" to the vehicle may vary depending on many factors, such as the type of vehicle, the country in which the vehicle is located, roadway type, weather, time of day or any other factor that could affect the driving performance of the vehicle. In certain embodiments, the description "roadways of interest" may refer to a vehicle's "electronic horizon." According to one embodiment, selection may be made from already detected objects based on which objects fit into a determined shape. According to another embodiment, objects are detected that are determined to be within the shape.

One aspect of the disclosure is to determine a vehicle horizon in order to contextualize objects. According to one embodiment, a vehicle horizon may be determined to characterize a vehicles trajectory, and possible trajectories, and objects may be tracked based one or more of object position and object trajectory relative to the vehicle horizon. One benefit of the systems and methods described herein is the ability to eliminate or ignore objects which have little or no likelihood of impacting operation of the vehicle. As will be discussed below, even objects in close proximity to the vehicle may be ignored or at least removed from vehicle tracking to free computational resources of the vehicle. One embodiment of the disclosure is directed to determining the trajectory of a vehicle and the trajectory of one or more detected objects. In contrast to detecting every object within a predefined area relative to a vehicle which requires computational resources for irrelevant or non-consequential objects, one or more of the vehicle trajectory and object trajectory can allow for processing objects that may impact the vehicle, require a change vehicle path and/or require a an vehicle operating command (e.g., breaking, speed change, route change, etc.).

In certain embodiments, the vehicle horizon may characterize a presentation of the physical world which includes certain objects that may be of interest to the vehicle. Unlike an electronic horizon that only includes road sections, a vehicle horizon would gather objects that are actually physically on road sections. Many other objects are of interest to the vehicle, as for example, pedestrians next to roads, deer that may be about to cross or traffic signs set to the sides of said road sections. One approach to include these other objects of interest could be to artificially enlarge the width of said road sections, whereby objects in the proximity of these roadway sections would also fall into the physical world layout described.

Conceptually enlarging the width of the road-sections contained by the vehicle horizon does provide an advantage to the first step of object detection. Some sensors are capable of detecting objects at a very large distance, well beyond the conceptually widened vehicle horizon; by marking any data obtained by said sensors beyond the conceptually widened vehicle horizon as irrelevant, processing power of the computational units on the vehicle can be reduced.

A conceptually widened vehicle horizon generalizes the area of interest for all types of objects along said road-sections; while a deer may rapidly sprint towards a road, pedestrians walking along a sidewalk, although very proximate the actual vehicle horizon, are much less likely to interfere with the vehicle (they are smarter, their intent is to walk along the road); thus a road-section enlarged to include any possible deer dashing towards the path of the vehicle will inevitably also include numerous pedestrians, and even other vehicles, which are very unlikely to have an immediate effect on the path of the vehicle.

Once an object is detected, its expected trajectory (which as has been defined includes the speed and the likely path) is valuable information in determining how much said object can influence the vehicle's trajectory. Without having yet classified an object (not because of a limitation of the invention, but as an example as to the value of an estimated trajectory, let's say we do not know if it is a deer or a human), if said object is static and far from the vehicle horizon (not conceptually widened), then computational efforts in identifying said object can be postponed until all more relevant object have been processed. A more relevant object may be a static object very proximate the vehicle horizon or an object with a trajectory that brings it within the path of the vehicle at the time the vehicle will share a roadway-section with said objects. Thus, a grazing deer in a field several yards may be ignored—even if we do not know it is a deer yet, but a vehicle in an opposite lane that appears to have lost control and is in route to the vehicle horizon may quickly be identified and consume much of the computational focus.

One aspect of the disclosure is directed to assigning objects to a roadway. In one embodiment, each object may be assigned to at least one road segment of a map independently of how the objects have been perceived or deemed relevant or not. As such, objects may be assigned to roadway segments irrespective of an electronic horizon in certain embodiments. Moreover, objects may be assigned to segments irrespective of having been determined relevant or not. Object assignment data may then be used with for one or more operations or control of a vehicle.

Objects are contextualized to road topography and computational power can be directed to those objects more relevant to the road topography affecting the ego vehicle. All featured described may be combined to form a single method of contextualization, or some may be forgone for the sake of simplification without circumventing the inventive notion described herein.

Embodiments of the disclosure are directed on-board vehicle systems and devices configured to detect objects without requiring tracking of proximate objects that of are low consequence. For example, vehicle systems and configurations discussed here can address situations where many objects may be near to the vehicle, or at least in the detection range, but not of consequence to the vehicle for one or more reasons. The on-board vehicle systems may be configured to detect and track objects that are relevant to the vehicles horizon, such as objects that may be in the vehicles path. By employing one or more of the configurations and processes discussed herein, the on-board vehicle system may better utilize computing resources to focus on relevant objects. In addition, detection of objects that may impact the vehicle is more readily determined. Object detection as used herein may be based on one or more different types of sensors and sensing technology, such as optical imaging, LiDar, Radar, etc.

Another aspect of the disclosure is directed to exchange of object data. In a driving environment, object data may be rich. In addition, driving conditions require vehicles to operate in accordance with vehicle speed and the speed of other objects associated with a roadway. Embodiments are described for exchange of object data. According to another embodiment, processes are provided for allowing for exchange of object data. According to one embodiment, a vehicle control unit and system are provided that allows for exchange of object information, such as object location, object trajectory, object classification, etc. System and device configurations may allow for a vehicle to receive, and in turn output, a detected object to assist other vehicles. In one embodiment, a configuration is provided to allow for vehicle-to-vehicle (V2V) sharing of objects. Shared object data may be used by a vehicle to detect objects of consequence to the vehicle. In other embodiments, systems, device configurations and processes described herein allow for a vehicle to filter received object information to only consider objects of consequence. According to another embodiment, configurations are provided to allow for a vehicle-to-infrastructure sharing of objects. Object data may be provided to a vehicle, or in turn from the vehicle to a network. In other embodiments, systems, device configurations and processes described herein allow for a vehicle to filter received object information from network sources and to only consider objects of consequence.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1:
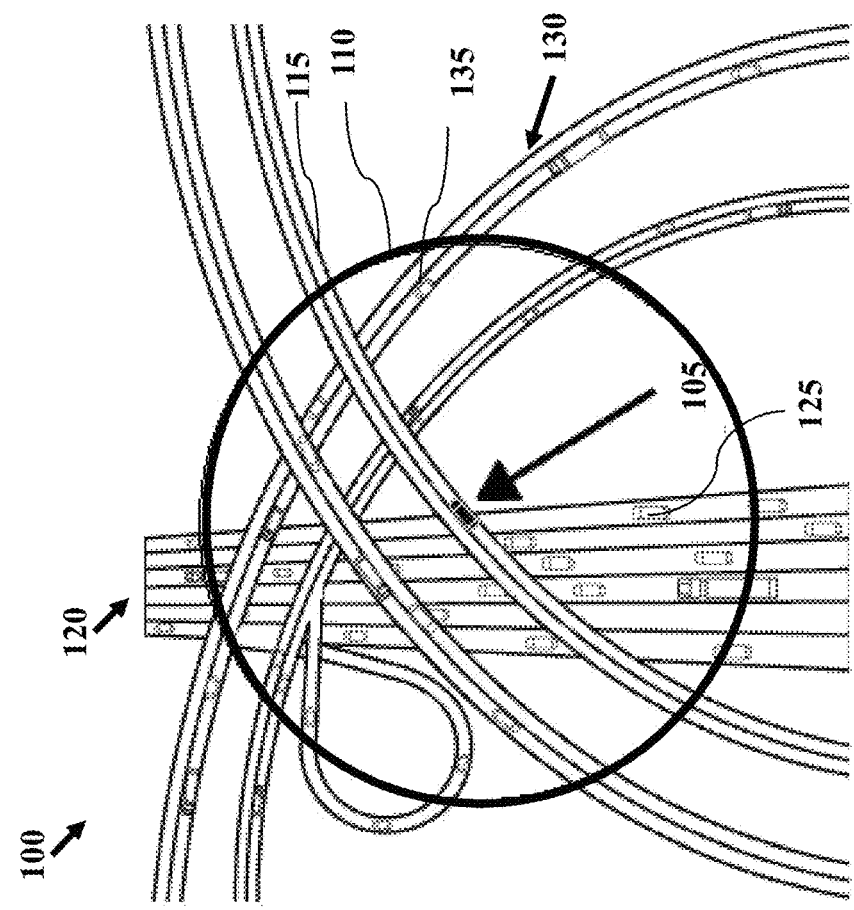
FIG. 1 depicts a graphical representation of a vehicle and object detection according to one or more embodiments.

FIG. 1 depicts a graphical representation of a vehicle and object detection according to one or more embodiments. According to one embodiment, systems, methods and device configurations are provided to allow for a vehicle to detect objects of consequence and filter from computational resources objects that are of little to no consequence to the vehicle.

FIG. 1 depicts environment 100 including vehicle 105. As will be discussed herein, device configurations are provided for a vehicle, such as vehicle 105, to allow for detection and handling of objects. Systems and processes are also provided for object detection and handing by a vehicle, such as vehicle 105. FIG. 1 illustrates an exemplary operating environment of a vehicle including a plurality of objects. Vehicle 105 may be configured with a detection area 110, shown as a circular detection area relative to the vehicle. As will be discussed herein, vehicle 105 may be configured to detect objects and assign objects to road segments related to the vehicle horizon of vehicle 105. As shown in FIG. 1, vehicle 105 is traveling along roadway 115, which does not intersect with other roadways that are proximate to vehicle 105, such as roadway 120, or roadway 130. According to one embodiment, although vehicle 105 may be configured to detect objects within detection area 110, such as object 125 (vehicle and object 135), vehicle 105 may be configured to not assign the objects 125 and 135 as objects that are to be tracked. Similarly, vehicle 105 may be configured to classify objects 125 and 135 as not being associated with a vehicle horizon of vehicle 105. As will be discussed below, a vehicle horizon may be determined for a vehicle, such as vehicle 105 which includes roadways within the detection area 110 and which exceeds the detection area 110 of vehicle 105. In addition, the vehicle horizon may include paths that may be taken by a vehicle, such as vehicle 105, and not paths that may affect the vehicle. By way of example, roadway 115 of vehicle 105 is an overpass to roadway 120, and based on trajectory of vehicle 105 along roadway 115 and the roadway topography, vehicle 105 cannot enter or travel on roadway 120 unless it is operated to an entry point of the roadway or roadways 115 and 120 merge (which is not the case in FIG. 1). As will be discussed herein, vehicle 105 may include one or more sensors or processing units to determine vehicle heading and operating characteristics, such as a trajectory of left to right travel with respect to FIG. 1, or similarly right to left travel According to one embodiment, the vehicle horizon of vehicle 105 may include roadway 115 which is the roadway vehicle 105 is traveling on, and not include roadway 120 or roadway 130 as the roadway topography of the environment in FIG. 1 does not allow for vehicle 105 to enter into roadways 120 and 130. Accordingly, vehicle 105 may characterize roadways, sections of roadways and objects in order to identify objects to monitor.

According to another aspect, systems, devices and processes are provided to overcoming objects which are proximate and remote (e.g., proximate remoteness). According to one embodiment, vehicle 105 may be configured to contextualize objects in a roadway topography to prioritize computational focus. By way of example, this can include assigning objects that may impact the vehicle operation to segments while not expending computational resources on objects that have little to no impact on the vehicle. By way of example, detected objects that are proximately remote, such as object 135 on road way 130 and object 125 on roadway 120 may be filtered by one or more modules of vehicle 105. Similarly, objects of consequence may be assigned to road segments to allow for monitoring of objects.

FIG. 2 depicts a process for contextualizing objects according to one or more embodiments. According to one embodiment, process 200 may be configured to contextualize objects relative to a vehicle horizon. Process 200 may be performed by a control unit (e.g., control unit 305 of FIG. 3, control unit 406 of FIG. 4) or other devices for handling objects identified by a vehicle. Process 200 may provide several benefits, including the ability to monitor objects associated with the vehicle horizon, and to filter objects detected by a vehicle, within a detection or scanning area of the vehicle.

According to one embodiment, process 200 is configured to contextualize objects relative to a vehicle horizon. In one embodiment, process 200 includes identifying a vehicle horizon at block 205. A vehicle horizon may be identified by the vehicle based on vehicle trajectory and roadway data relative to the vehicle position. Identifying the vehicle horizon may also include determining at least one roadway segment based on the roadway data.

In one embodiment, a roadway system, such as the set of roadways of environment 100, may be characterized by each road of the roadway system. In addition, each road, or section of road may be characterized. In certain embodiments, roads and sections of roads may be segmented into sections, or roadway segments. In certain embodiments, the roadway segments may be associated with fixed or uniform segments for multiple vehicles. In other embodiments, roadway segments and segment data (e.g., start point, end point, etc.) may be generated by a vehicle. In certain embodiments, each roadway segments is a section of a roadway which may be determined by a vehicle. In certain embodiments, roadway segments are of fixed length. In other embodiments each roadway segment may be generated based on vehicle speed. As such, a vehicle traveling at high speed (e.g., 55 mph) may have roadway segments that are longer than a vehicle traveling at a lower speed (e.g., 15 mph). The vehicle horizon may be updated by a vehicle based on vehicle position and changes in the roadway topography. As the vehicle is operated, certain paths of the roadway topography may no longer be included in the vehicle horizon, while other segments may be added.

Identifying a vehicle horizon a block 205 may include utilizing a current stopping distance of a vehicle, or a multiple of the stopping distance to estimate the minimum length of the electronic horizon. Using stopping distance may improve upon existing electronic horizons by accounting for vehicle operating characteristics. In certain embodiments, stopping distance of the vehicle based on the current operating conditions and additional buffer distance may be employed to generate a minimum required length of the vehicle horizon. As such, a calm (e.g., comfortable) stopping distance may be utilized which accounts for vehicle handling. The calm stopping distance may be associated with a linear distance. The calm stopping distance may be characterized as having a longer distance for higher speeds of travel. As such a linear distance of 1-5 feet (0.3-1.5 m) may be used for low speeds whereas traveling at higher speeds such as highway travel may require a linear distance of 25 to 150 ft (7.5-45 m). The linear distance associated with the calm stopping distance may be used to limit a vehicle horizon. In certain embodiments, the linear distance may relate to a predefined distance irrespective.

In one embodiment, each roadway segment relates to a section of a roadway identified by the control unit, wherein each roadway segment is determined based on vehicle operating characteristics. According to one embodiment, segment length may be determined based on at least one of stopping distance of a vehicle, forward travel speed, and roadway characteristics. Segment distance in an exemplary embodiment may be characterized as a forward travel distance of interest equal to 1.5 times the calm stopping distance at the current speed of the vehicle plus 1.5 the calm stopping distance of a reference vehicle (e.g., standard car) at the current speed limit. The segment distance may be dynamically determined. According to one embodiment, the vehicle horizon may be determined based on segment length and calm stopping distance. The vehicle horizon may also be characterized and/or determined based on a reverse travel distance. In an exemplary embodiment, the reverse travel distance of interest may be equal to the emergency stopping distance of a reference vehicle at the current speed limit of the roadway.

In one embodiment, the vehicle horizon relates to a current roadway of the vehicle and roadway path relative to the current roadways within a predefined area (e.g., linear distance) and based on the vehicle trajectory.

According to another embodiment, the vehicle horizon may be characterized by segments of interest. A vehicle control unit may determine one or more segments of interest as all roads or road sections that can be traveled in one or more travel distances of interest. By way of example, as will be discussed below FIG. 5A, roads or road sections that a vehicle may travel may relate to the roadway topography, vehicle position and trajectory. In certain embodiment, the segments of interest also may be limited by a linear distance.

In one embodiment, the vehicle horizon is determined based on a forward looking trajectory of the vehicle for the current roadway and potential roadways from the current roadway. Forward looking trajectory of the vehicle may include the operating conditions of the vehicle with respect to roadway segments in the direction of travel of the vehicle. According to another embodiment, the vehicle horizon is determined based on a forward looking trajectory of vehicle path and for intersecting roadway paths approaching the vehicle position. The intersecting pathways may be in the direction of travel. Alternatively or in combination, the intersecting roadway paths may be behind or with respect to a reverse view of the vehicle to identify objects which may intersect with the vehicles operational path. The reverse view may be characterized by as viewing a vehicle in an opposite direction of travel (e.g., view of the vehicle flipped around) and all segments that would be included in the extended horizon if that direction of travel are identified and included in the extended direction of travel. The vehicle horizon, in contrast from conventional electronic horizons, is configured to add objects including object with a velocity. Accordingly, objects entering a vehicle path or trajectory may be addressed. Similarly, objects that are approaching a vehicle may be accounted for.

According to one embodiment, the vehicle horizon identified at block 205 may be based on a maximum speed of the vehicle (e.g., future max speed), based on the speed limit of multiple road segments the vehicle is likely to traverse. An estimated stopping distance may be calculated based on the speed limit values (or a multiplier of the speed limit values) to determine an enhanced minimum length of the electronic horizon, is an improvement on the current concept of the electronic horizon. By way of example, vehicle on a road with a maximum speed limit of 45 MPH, about to join a highway with a max speed limit of 80 MPH, will likely have a longer stopping distance once it joins the highway. Accordingly, the vehicle horizon may be determined to account for the eventual increased speed limit. Similarly, the vehicle horizon may be determined by considering the speed limit of road segments merging into a vehicle electronic horizon. The base vehicle horizon may be first determined based on dynamic characteristics of a vehicle alone, and merging road segments may be added to an expanded electronic horizon for a length at least equal to a standard stopping distance of a standard vehicle. In addition to considering the speed limit of the road segments merging into a base vehicle horizon, a buffer distance may be added above the calculated stopping distance.

In certain embodiments, identifying the vehicle horizon includes considering the speed limit of more than just the first adjacent road segments merging onto a base vehicle horizon. For example, the speed limit of road segments further away from a base vehicle horizon may be considered when a segment speed limit is necessary to calculate the segments to include in the extended electronic horizon. This operation may be necessary when a road segment adjacent to the base vehicle horizon is shorter than the stopping distance of a vehicle traveling on the road segment at the speed limit, or a multiplier thereof. This operation may be useful when road segments are not usually defined by the speed limit.

According to one embodiment, identifying a vehicle horizon at block 205 may include determining which segments of a roadway to select. For example, all segments adjacent to a vehicles current roadway and subsequently adjacent segments leading onto a base electronic horizon may be identified while assuming the stopping distance of a vehicle on the segments for the current vehicle position. Alternatively, a vehicles current speed and speed in future segments may be used to determine which adjacent and subsequently adjacent segments are added to the vehicle horizon.

In certain embodiments, the vehicle horizon determined at block 205 includes setting a stopping distance. The stopping distance may be set between a coasting stopping distance (if the road is not downhill) and an emergency stopping distance, with a standard setting set at a calm stopping distance. A calm stopping distance may relate to the distance to an object from where a typical experienced driver would start applying the brakes, at the current driving velocity, if the driver would desire to stop before the object and the object was not suddenly perceived at the time of applying the brakes. The calm stopping distance may produce an agreeable deceleration rate, indistinguishable from the stopping rate to a stop sign, for example.

At block 210, process 200 includes identifying one or more objects. The control unit may receive input from one or more sensors providing data relative to a detection area of a vehicle. In certain embodiments a vehicle may receive object information from a source, such as a network source or another vehicle. In one embodiment, identifying at least object includes detecting at least one object by a sensor of the vehicle. Using one or more of radar, Lidar, optical image sensors, and vehicle sensors in general, object location may be detected relative to vehicle. Alternatively or in combination, identifying an object at block 210 is based on object data received. Process 200 includes optional block 211 for receiving object data which may relate to object data provided by one or more of a vehicle-to-vehicle (V2V) and vehicle-to-infrastructure (V2I) source. Object data received at block 211 may include at least one of a segment, object location and object classification. In certain embodiments, object velocity may be received. In block 210, process 200 may identify objects based on received data and/or sensor data of the vehicle. For example, identifying objects at block 210 includes receiving at least one object from at least one of another vehicle and a communication network. The object data may be provided with location data for the at least one object, including but not limited to coordinate data (e.g., GPS), roadway data, and segment data.

According to one embodiment, identification of objects in block 210 of process 200 is based on objects determined to be relevant (or not relevant) based on the likelihood each object will interact with a particular vehicle and the roadways surrounding the vehicle. Identification of objects in block may 210 may be based on a shape created around a vehicle horizon. An exemplary process identifying objects of block 210 is described below with reference to FIG. 13

As shown in FIG. 2, identifying a vehicle horizon at block 205 and identifying objects at block 210 may be performed separately or in combination. In certain embodiments, objects may be identified prior to a vehicle horizon is identified. In other embodiments, a vehicle horizon may be identified at block 205 and then object identification at block 210 may be associated with the vehicle horizon.

At block 215, the control unit assigns objects identified by the control unit to a roadway segment. Assigning an object to a roadway segment cam include associating the object to a segment. In certain embodiments, an object is associated with a segment after the control unit determines that the object is located within a roadway segment of the vehicle horizon. In certain embodiments, objects near a roadway segment may be assigned to a segment. Assigning an object to a segment may be based on the object movement in a direction towards a segment.

The roadway segments may relate to segments of roadway which are associated with the vehicle horizon. In one embodiment, each object assigned to a roadway segment is assigned based on the vehicle horizon. By way of example, objects which are near or located in a roadway segment may be assigned to that segment. Objects which are not in or near a roadway segment of the vehicle horizon will not be assigned to a segment of the vehicle horizon. As such, these unassigned objects are detected or identified by a vehicle but not assigned to objects that may be monitored. In one embodiment, a vehicle may store a record of assigned objects and segments. By way of example, the record may be an electronic listing associated the object to one or more segments.

In one embodiment, assigning an object identified by the control unit to a roadway segment at block 215 is based on a linear distance that is determined for a vehicle. The linear distance may be determined using a calm stopping distance for the vehicle. As such, the linear distance may be dynamically determined based on vehicle operating conditions, other vehicles in proximity to the vehicle and/or roadway type. According to one embodiment, process 200 includes using a linear distance of travel upon a roadway to determine and/or limit the vehicle horizon to a manageable amount. Without the use of a linear distance, map data for an entire geographic region (e.g., entire the map of the United States) could become part of the electronic horizon. In one embodiment, the linear distance is based on a comfortable stopping distance for the vehicle. In certain embodiments, the linear distance associated with the vehicle horizon is approximated to a comfortable stopping distance for said vehicle.

According to another embodiment, object assignment at block 215 may be performed independent of how a set of objects has been perceived or deemed relevant. An exemplary process assigning objects at block 215 is described below with reference to FIG. 14. In certain embodiments, each object may be assigned to at least one road segment in a map independent of its status as relevant or not. In addition, object assignment may be independent of determination of a roadway in this example. Embodiments are provided that included assigning objects to a roadway segment prior to selection of an object for monitoring or inclusion in a vehicle horizon.

According to one embodiment, process 200 may optionally classify objects at block 216 prior to assigned objects at block 215. Objects may be classified according to one or more predefined categories, such as a person, vehicle, vehicle type, stationary object, roadway elements (e.g., barrier, sign, etc.). Object classification may allow for controlling operations of a vehicle, such that a person may be treated different than a vehicle with respect to vehicle operation.

At block 220, process 200 includes monitoring each object assigned to a roadway segment associated with the vehicle horizon. Monitoring may include utilizing one or more of the object, object position, and object movement as a basis for determining vehicle operation. Monitoring can include tracking object position for objects within the vehicle horizon. When an object relates to a vehicle on a roadway in front of an ego-vehicle, the ego-vehicle may activate a vehicle control mechanism, such as active breaking in response to the other vehicle slowing down. Alternatively, when the object is a person vehicle may activate control mechanisms specific to detection of the object as a person, such as breaking controls, speed controls, steering, etc. One or more operations based on monitoring at block 220 may allow for optionally outputting an alert at optional block 225 and performing vehicle control at optional block 230.

At optional block 230, process 200 may include outputting an alert to an operator of a vehicle. By way of example, alerts may include warning indicators, or graphical elements presented to a vehicle operator. At optional block 230, process 200 may include controlling vehicle operation relative to objects in the vehicle horizon. Controlling vehicle operation may be based on one or more objects and based on object classification.

In certain embodiments, objects identified and assigned to a segment in process 200 may be shared with other vehicles or network services.

Figure 3:
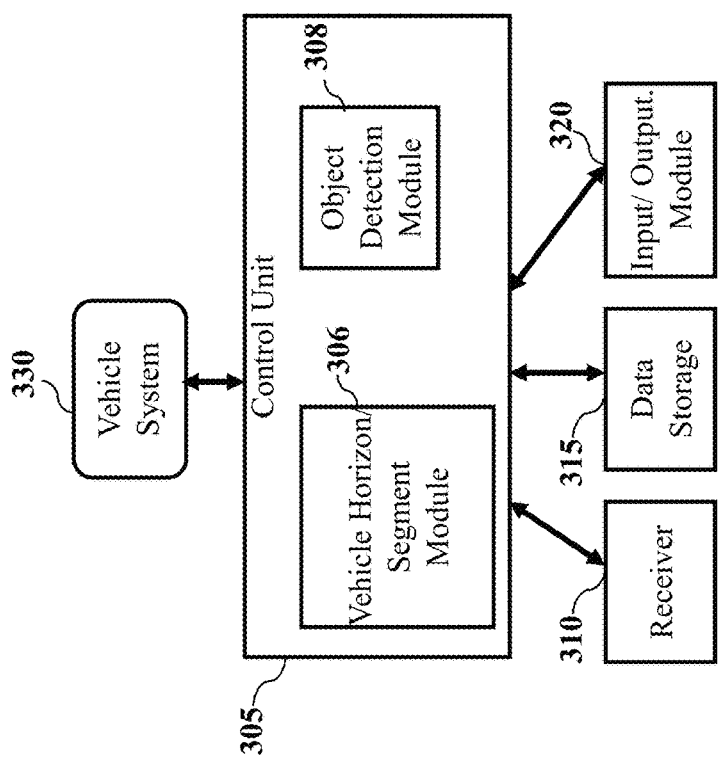
FIG. 3 depicts a graphical representation of a vehicle control unit according to one or more embodiments.

FIG. 3 depicts a graphical representation of a vehicle control unit according to one or more embodiments. According to one embodiment, a vehicle (e.g., vehicle 105) includes a control unit 305 which may be configured to interface with one or more vehicle components. According to one embodiment, control unit 305 may be configured to perform one or more processes and functions described herein, such as process 200 of FIG. 2. Control unit 305 may relate to a control unit of a vehicle navigation unit or assistive driving module.

In an exemplary embodiment, control unit 305 includes one or more elements or modules. FIG. 3 shows control unit 305 including a vehicle horizon/segment module 306 and an object detection module 308. Modules of control unit 305 may be configured to perform functions for one or more of assisted driving, autonomous driving and vehicle control. Control unit 305 is configured to for interface with one or more vehicle components. Control unit 305 may receive position data for the vehicle, object data, and data in general from receiver 310. One or more executable instructions and navigation data (e.g., map data) may be stored by data storage 315. Input/output module 320 may be configured to interface with vehicle components and/or other vehicles. Control unit 305 may be configured to communicate with a vehicle system 330, including an ECU.

According to one embodiment, vehicle horizon/segment module 306 represents one or more functional and hardware elements of control unit 305 that may be configured to determine a vehicle horizon. In one embodiment, a vehicle horizon is calculated by vehicle horizon/segment module 306 to first include all roadway sections which may contain objects which may affect a vehicle's immediate trajectory (path and speed). In one embodiment, vehicle horizon is determined by including planned roadway sections of a vehicle to a distance equal to a comfortable stopping distance from the current vehicle location. Then, all diverging roadway sections in the direction of travel of the ego-vehicle may be added to a rapid stopping distance for the planned speed, on the planned roadway and at the point of divergence. The comfortable stopping distance may take in account all speed limits and planned speed on all planned roadways. A rapid stopping distance for each particular diverging roadway is equal to the rapid stopping distance of the ego-vehicle from the planned velocity of the ego-vehicle at the point where the planned roadway meets the diverging roadways.

In one embodiment, the vehicle is expected to remain on a planned path, and the diverging roadways are included as routes the vehicle may use to take into account when planning its trajectory on the planned path of the moment. Once the ego-vehicle decides to use one of the diverging roads, a selected road becomes the main path and vehicle may then use the comfortable stopping distance on the selected road to include in the new vehicle horizon. All segments, which may include objects whose current path would be affected by sudden awareness of the vehicle or by a sudden change of the vehicle's path, are added to the network of roadway segments selected. The network of objects that may be affected by the vehicle are typically on roadway sections converging to the current planned path of the vehicle. This can include the roadway sections behind the vehicle and also can include any roadways sections the vehicle has already traversed. A rapid stopping distance on all converging roadway sections can be used to determine how far back to include converging sections. In one embodiment, the stopping distance of a vehicle may be measured up to the vehicle, so converging roadway sections far forward on the planned vehicle path may not be included in the vehicle horizon. All roadway sections that may converge onto any diverging roadway section which is, or will become, part of the vehicle horizon may also be included. In certain embodiments, similar to all other converging roadway sections, only those that are within a rapid stopping distance from the ego-vehicle need to include in the vehicle horizon. A network of roadway sections which may contain objects that can either affect the vehicle in a calm fashion or which the vehicle can affect in an emergency or rapid fashion have been included.

With a defined vehicle horizon, software processes analyzing sensor data can be tuned to ignore any data perceived at a predefined distance from the vehicle horizon. As a result, a reduction of the computational focus is achieved. In certain embodiments, distance from the vehicle horizon is used in an unspecific orientation. This process can equally be used to disregard data at "ground level" as well as at a different predefined distance in elevation or a combination thereof.

According to one embodiment, object detection module 308 represents one or more functional and hardware elements of control unit 305 that may be configured to detect objects relative to a vehicle. As objects are detected, and while they may have or may have not been classified, their location, orientation and motion vectors can be used to assign them to a particular road section or sections. For example, an object very proximate the ego-horizon may be assigned to a roadway section belonging to the vehicle horizon and computational focus may be assigned to processing the object's behavior. Similarly, an object with a trajectory (speed and path) that brings the object proximate enough to a roadway segment of the vehicle horizon at a point in time when the object may affect the planned trajectory of the vehicle may be assigned to a roadway section, or sections, which appear to be in the trajectory of the moving object. Once assigned, the object becomes part of the computational focus of the vehicle. As a result, objects that may not currently be within the vehicle horizon, but which may become part of it, may be characterized as perceived objects as part of the roadway sections of the ego-horizon that may be affected by the objects. In one embodiment, objects are important not only because they may become part of the vehicle horizon by entering any roadway section that conforms it, but also by letting the vehicle be aware of the objects for emergency maneuver planning.

Vehicle horizon/segment module 306 may identify one or more segments. In one embodiment, objects may be assigned to a particular roadway section by map matching, which includes supplying a control unit 305 with a world location, or a world location and an estimated trajectory. According to another embodiment, control unit 305 analyzes a map database to estimate the most relevant roadway section or sections to the provided world location, or world location and the trajectory. It is possible that an object gets matched to multiple roadway sections, for example, when similarly proximate to two or more such sections. Multiple assignments (of an object to roadway sections) will not cause multiple computational focus; an object is assigned to one or more roadway sections to determine if said object is of interest to the ego-vehicle, this is determined by evaluating if any roadway section the vehicle has been assigned to belongs to the vehicle horizon. However, an object is not more relevant if the object has been assigned to more than one roadway section. The process of assigning an object to more than one roadway section when it cannot clearly be assigned to a single roadway section is so as to insure that it will not be missed if it possibly could affect the ego-vehicle.

Some objects may be detected by sensors on or off the vehicle that do not belong or cannot logically be assigned to any roadway section on the vehicle horizon. Rather than discard the objects, it may be preferable to assign the objects to the roadway section or sections with which they are most likely to interact. In doing so, when a roadway section or sections that contain an object as just described becomes part of the vehicle horizon, the objects will immediately be known and computational focus may immediately be assigned to it. Some objects may be too far from any roadway section yet may be perceived by objects on or off the vehicle. In such case, it may be of a software architecture advantage to assign them to a NULL roadway section—a vacuum of sorts.

In planning emergency maneuvers, it may be important to know all possible objects in the very near proximity of the vehicle. In this case it may be advantageous to overlap an area of interest around the vehicle within which all objects are detected, whether proximate or not to the ego-trajectory.

By reducing the computational focus to only those objects that have a significant likelihood of interacting with the vehicle or being affected by the vehicle. It may be possible to reduce cost, heat, power consumption, weight and size of the compute units on the vehicle, but more importantly the vehicle will be able to process data that makes autonomous driving safer by prioritizing computational focus first on those objects more likely to affect the current state of the vehicle.

Control unit 305 may monitor vehicle operating and output control signals to vehicle system 330 for vehicle control, such as breaking control commands, steering commands, speed change, etc. Control unit 305 may be configured to receive additional data for directing vehicle system 330. In one embodiment, receiver 310 may receive one or more route services data including traffic, weather, roadway closures, etc. that may be used to select, and in some cases avoid, one or more routes or route segments.

Control unit 305 may relate to a controller or processor. Control unit 305 may execute code stored in data storage 315. In certain embodiments, data storage 315 includes non-transitory data. Data storage may provide mapping information and object information.

Figure 4:
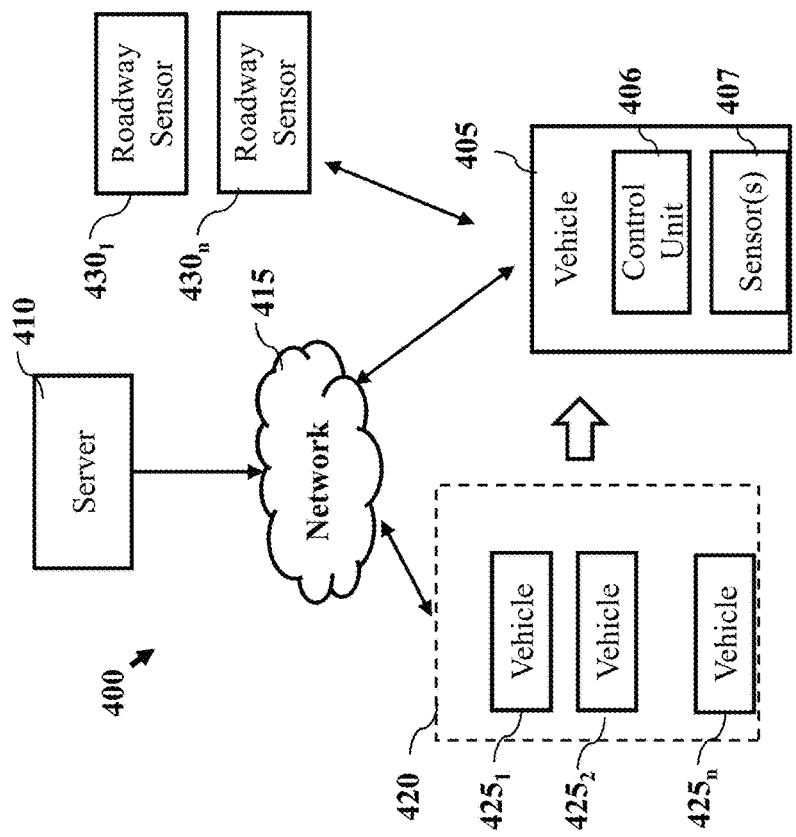
FIG. 4 depicts a graphical representation of a system configuration according to one or more embodiments.

FIG. 4 depicts a graphical representation of a system configuration according to one or more embodiments. According to one embodiment, system 400 allows for vehicle 405 to receive data from one or more sources. In an exemplary embodiment, system 400 provides data to vehicle 405 from a network entity, such as server 410 by way of communications network 415. As such, system 400 may be configured as a vehicle-to-infrastructure (V2I) system. In another embodiment, system 400 provides data to from vehicle 405 relative to other vehicles, such as vehicle pool 420 including vehicles 425$_{1-n}$. As such, system 400 may be configured as a vehicle-to-system (V2V) system. In certain embodiments, vehicle 405 may be configured to receive and exchange data relative to server 410 and vehicle pool 420. According to yet another embodiment, system 400 may include one or more sensors, such as sensors 430$_{1-n}$ which may relate to roadway sensors configured to provide data to vehicle 405. Roadway sensors may be located along a roadway. One or more of the processes, functions and configurations described herein may be performed by vehicle 405.

In one embodiment, system 400 may be configured to service multiple vehicles without having to report every vehicle, or to report every object to a vehicle. Doing so would not only consume a large amount of communication bandwidth, it would also likely overwhelm the computer system on the vehicle. Server 410 may maintain a list of objects assigned to segments (and possibly a list of segments assigned to object to make reverse search easier). The segments used by server 410 need not be the same segments used by each individual vehicle. Multiple map suppliers and roadway segmentation formats may be supported. However, server 410 can assign objects according to how system 400 understands them. In certain embodiments, server 410 and vehicle 405 may utilize the same roadway data set and convention for naming roadway segments. In other embodiments, vehicle 405 may assign an object to a roadway segment different from the roadway segment nomenclature of the server.

According to an exemplary embodiment, server 410 is configured to distribute detected objects to a vehicle continuously. By way of example, a vehicle horizon may be calculated for a vehicle using a network understanding of segments, the car speed and if available, planned vehicle trajectory. Using segments estimated for the vehicle horizon, a list of objects of interest to the vehicle may be obtained. Server 410 may remove any objects duplicated in more than one segment and send all objects of interest to the vehicle. Sending objects can include data for object position. In certain embodiment, object position data is not sent with a segment assignment as vehicles may operate with different segment definitions.

FIG. 4 shows vehicle 405 including control unit 406 and one or more sensors 407. Vehicle 405 may employ a system of sensors, such as one or more of Lidar, radar, imagining, etc. In one embodiment, sensors 407 available to vehicle 405 may detect a large number of objects. Not all of the detected objects are necessarily of interest to vehicle 405. Similarly, sensors in other vehicles, such as vehicles 425$_{1-n}$, or along the road infrastructure may detect objects, which are then transmitted to vehicle 405 and become part of the object knowledge of vehicle 405. According to one embodiment, if a detected object has little to no near-term influence on the trajectory of vehicle 405, then detecting, identifying, tracking, and consequently considering the object in the trajectory formation of vehicle 405 would consume valuable compute resources which may affect the performance of the system of vehicle 405 as a whole. According to one embodiment, processes and configurations discussed herein contextualize objects to road topography that is of interest to vehicle 405, whereby the objects that cannot reasonably be assigned to the road topography are considered of less importance. Objects of less importance may still be tracked to determine if they eventually become part of the road topography of interest to the ego-vehicle, but additional processing may be limited. In road vehicle applications, reducing the weight, power consumption, size and cost of an electronic product while maintaining its performance is generally perceived positively.

According to one embodiment, control unit 406 may be configured to receive a plurality of objects from server 410 and/or vehicle pool 420. Control unit 406 may then determine which objects are to be assigned to its vehicle horizon. Control unit 406 and vehicle 405 may be configured to share object data. In one embodiment, vehicle 405 may be configured to send all objects it has detected. According to another embodiment, control unit 406 may remove any objects previously received from server 410 or other vehicles, and send the remaining objects. As such, server 410 may already know about most or all these objects. In yet another embodiment, vehicle 405 is configured to send objects of interest as determined during vehicle travel. Server 410 may direct operations of vehicle 405 as more and more objects are provided to server 410 as the vehicle travels. Objects could be detected that are not of interest to the vehicle, but which may be of interest to other vehicles and yet no other car has yet reported. Reporting of vehicle 405 may also depend on the amount of traffic on the road. Server 410 could request vehicle 405 to change the reporting process. For example, if there are many cars on the road, it is unlikely that an object seen by one vehicle, but not of interest to it, would not have been reported back by another car. On the other hand, at night and in a lonely road, may be all objects should be reported. Server 410 may have a map of the road and the position of the ego vehicle; it also has information of other cars on the road, so it should really be up to the network services (e.g., cloud) to define which or how to report objects.

According to one embodiment, control unit 406 may be configured to provide one or more vehicle operating functions for vehicle 405 based on objects detected by sensor 407. In certain embodiments, vehicle 405 may identify objects based on output of sensors 407. According to another embodiment, vehicle 405 ay identify one or more objects shared from at least one of vehicles $425_{1-n}$ of vehicle pool 420 and server 410. Operations performed by control unit 406 may be in response to object assignment to roadway segments.

FIGS. 5A-5D depict graphical representations of vehicle horizon according to one or more embodiments. According to one embodiment, a vehicle horizon is a network of roadway sections which are of interest to a vehicle (e.g., vehicle 105, vehicle 405, etc.). The vehicle-horizon may be utilized to identify roadway segments for a vehicle trajectory (e.g., identifying at block 205 of process 200). As used herein, vehicle horizon may relate to an ego-horizon, which is a network of roadway sections which are of interest to a particular vehicle or ego-vehicle. FIGS. 5A-5D illustrate an exemplary network of roadways with multiple road sections.

Figure 5B:
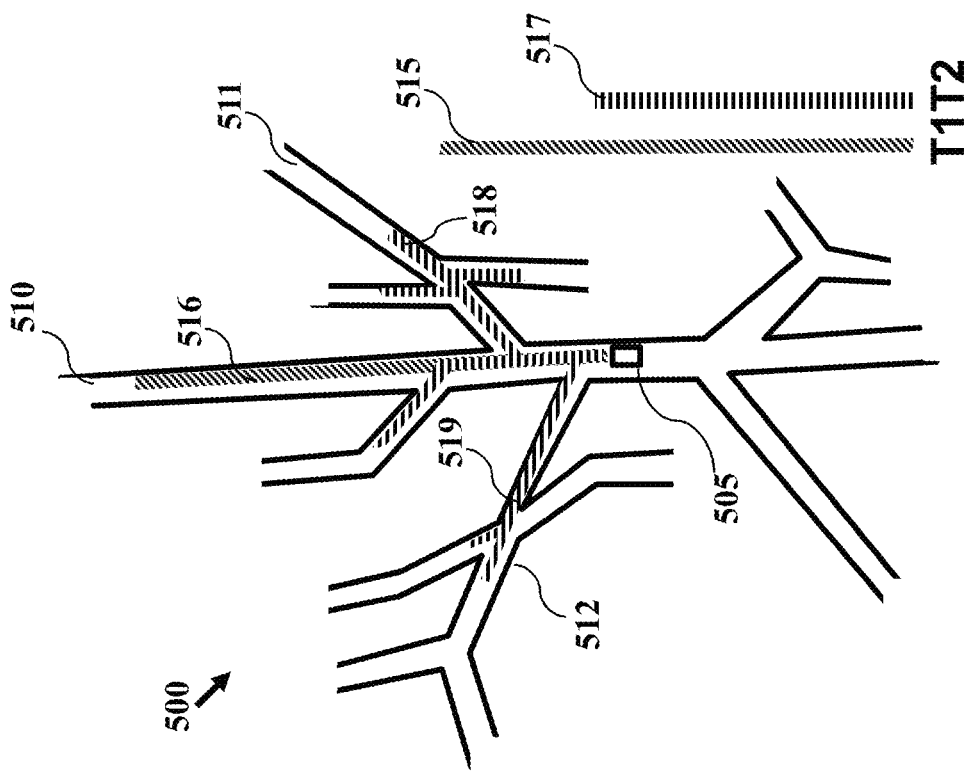
Figure 5A:
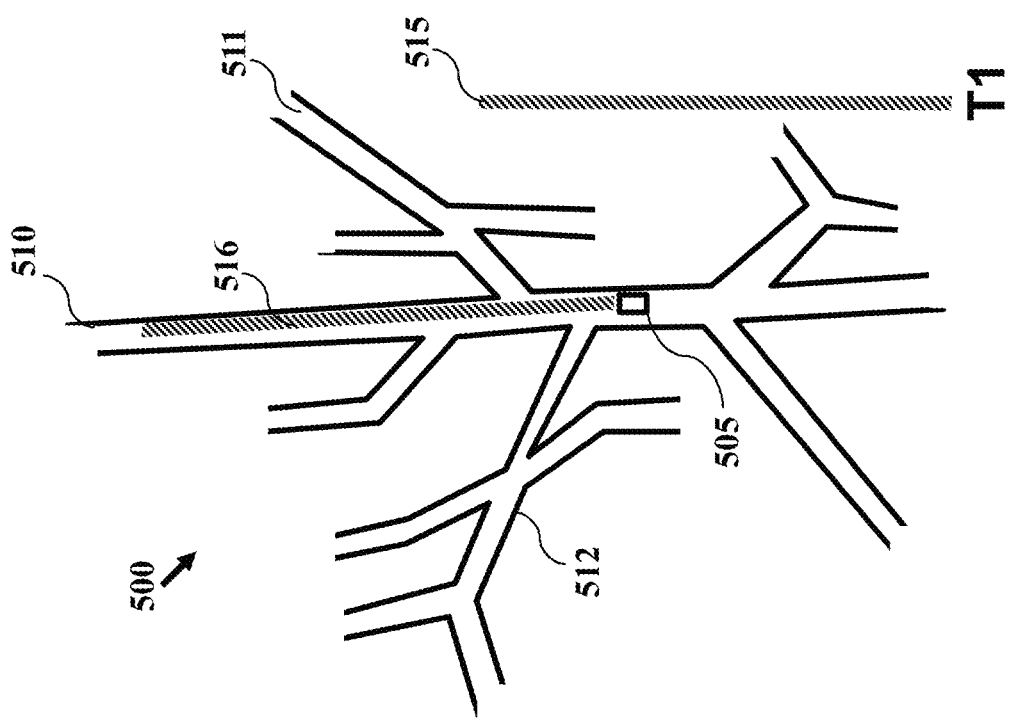

Referring to FIG. 5A, roadway system 500 includes a network of roadway sections and a vehicle 505 (e.g., ego-vehicle). Vehicle 505 may include a control unit and may be configured to perform one or more processes described herein to identify roadway segments, identify objects and assign objects to roadway segments. Roadway system 500 includes road 510 associated with vehicle 505 and one or more other roads that vehicle 505 may travel on, such as roadway 511 and roadway 512. According to one embodiment, a vehicle horizon may relate to all road sections in the currently planned travel path of vehicle 505 and roadways which can be reached by vehicle 505 from its current position within a predetermined time T1, shown as 515 in FIG. 5A. FIG. 5A depicts the trajectory 516 of vehicle 505 during time period T1 along roadway 510. The vehicle horizon may also include the networks of road sections that the vehicle can reach. Referring now FIG. 5B, the vehicle horizon can include all roadways in the direction of travel of vehicle 505 which can be reached in a predetermined time T2, shown as 517. Trajectory 518 and 519 represent potential vehicle trajectories with respect to roadways 511 and 512, respectively. As such, the vehicle horizon includes trajectory 516 associated with roadway 510 and time period 515 and trajectories 518 and 519 associated with roadway sections 511 and 512. T2 may relate to a calm stop time at current speed and which forks from, or forms an intersection away from, the previously included road section 510. According to another embodiment, the vehicle horizon also accounts for stopping distances of vehicles relative to speed of vehicle 505. FIG. 5C shows the vehicle horizon including roadway sections vehicle 505 followed to reach its current location for a distance D1, shown as 520, equal to a standard stopping vehicle of a vehicle travelling at 1.25 times the speed limit on said roadway sections. The vehicle horizon may be determined by adding all roadways that merge into or intersect, such as roadway 525, towards all previously included roadway sections, such as roadway 521, and which are at a distances 525 from the ego-vehicle equal to the standard stopping distance of a vehicle traveling at 1.25 the speed limit on said roadway sections as shown in FIG. 5D. The resulting roadway network, shown in FIG. 5D includes roadway sections of interest to vehicle 505. According to one embodiment, objects detected and monitored are based on the vehicle horizon determine, such as roadway sections identified in FIG. 5D. According to one embodiment, sections of roadway associated with the vehicle horizon may be segmented, and identified objects may be assigned to one or more segments.

According to an exemplary embodiment, the vehicle horizon may be determined assuming that other vehicles, and/or vehicle 505, will not travel at over 25% of the speed limit, or a predefined amount relative to a speed limit assigned to a roadway. FIGS. 5A-5D depict operations to illustrate identification or determination of a vehicle horizon with respect to object identification, filtering and monitoring. Reference to "calm stopping distance" may impart that the vehicle-horizon is in part to ignore all objects for which a change in the ego-vehicle trajectory has no immediate effect and to include all objects whose change of trajectory may have an immediate effect on vehicle 505.

In certain embodiments, FIGS. 5A-5D depict representations of a vehicle horizon. Processes and configurations discussed herein may only report objects within a travel distance of interest. By way of example, similar to the well-known idea of not outrunning ones headlights, stopping distance in the context of a vehicle horizon may be configured to allow for being able to see each object at a distance needed to stop. As such, instead of setting a vehicle horizon to a predefined distance, the vehicle horizon may be based on a stopping distance. As such, the systems, devices and processes described herein allow for a vehicle to not outrun its vehicle horizon.

Figure 6:
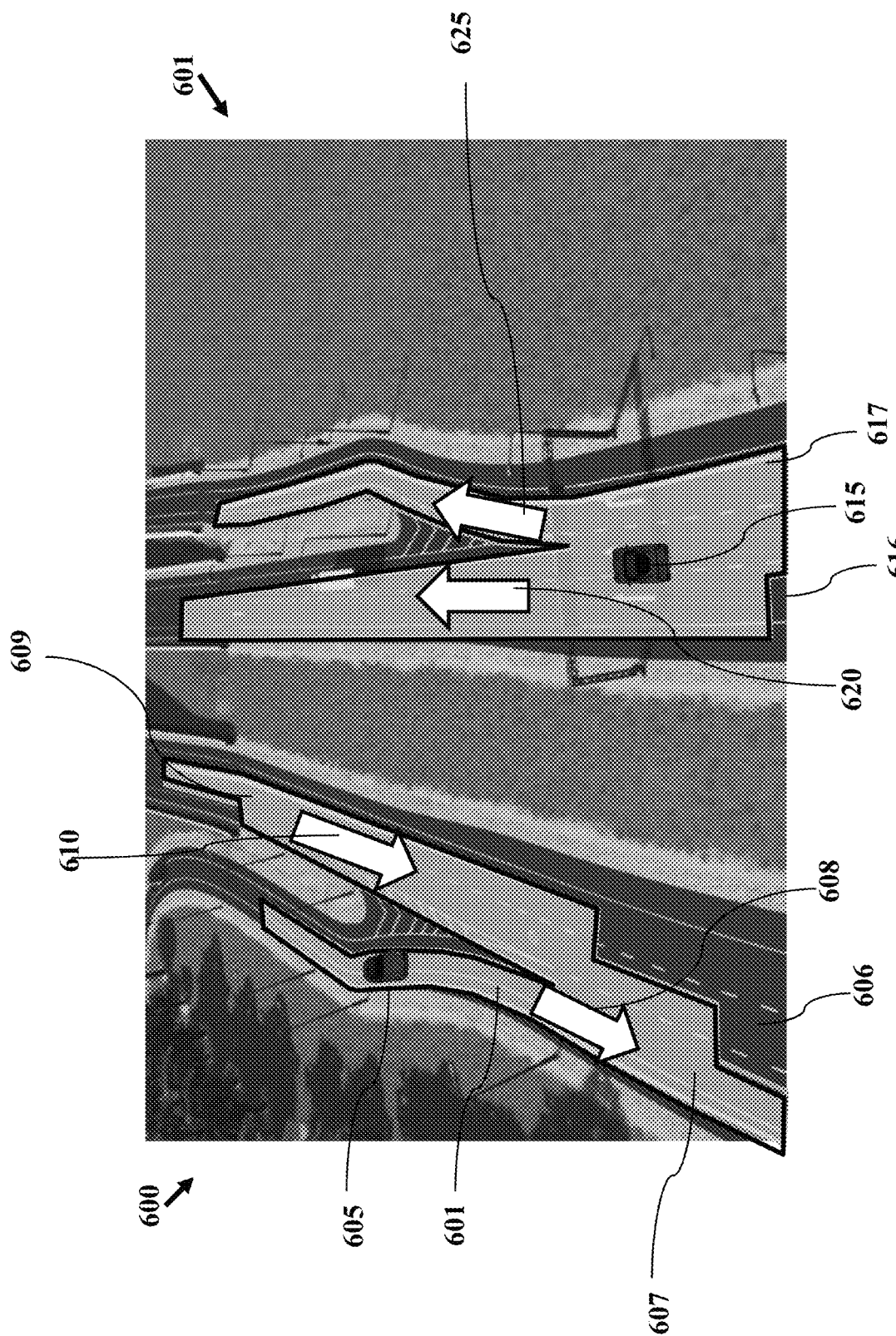
FIG. 6 depict a graphical representation of vehicle horizons according to one or more embodiments.

FIG. 6 depicts a graphical representation of vehicle horizons according to one or more embodiments. According to one embodiment, vehicle may determine a vehicle-horizon in order to identify roadway sections and/or to filter objects that are of interest. FIG. 6 shows two examples of vehicle horizons determined for vehicles.

Roadway environment 600 shows vehicle 605 merging onto roadway 606 from an entryway. According to one embodiment, vehicle horizon 601 of vehicle 605 includes roadway segment 607 associated with vehicle trajectory 608. According to another embodiment, vehicle horizon 601 determined for vehicle 605 also includes roadway segment 609 associated with a roadway or roadway segment that merges into or intersects with, trajectory 608. According to one embodiment, object trajectory 610 associated with one or more other objects may be tracked relative to vehicle horizon 601 of vehicle 605. According to one embodiment, the vehicle horizon for vehicle 605 includes backward looking or rearview component for vehicle 605, by including roadway segment 609. As such, the vehicle horizon employed by vehicle 605 and by the processes and configurations described herein allows for object assignment in paths that vehicle 605 may not travel on, and which likely do not affect operation and/or travel path of vehicle 605. By way of example, a second vehicle (not shown in FIG. 6) that may be traveling on roadway segment 609 may be identified, and its trajectory, for example trajectory 610 may be used by vehicle 605 to determine and/or control operation. Vehicle 605 can learn about vehicles on roads it merges onto by employing a vehicle horizon that allows for reverse lookup.

According to one embodiment, vehicle 605 may identify one or more segments of roadway 606. Segments may relate to lanes of roadway 606, and one or more sections. Segments may also be determined based on at least one of the speed of vehicle 605, speed limit for roadway 606 and the vehicle horizon.

Roadway environment 601 shows vehicle 615 traveling on roadway 616 with the option of exiting. According to one embodiment, vehicle horizon 617 of vehicle 605 includes roadway segments associated with vehicle trajectory 620 and potential vehicle trajectory 625 associated with exiting roadway 616. According to one embodiment, vehicle 615 may determine and account for objects in its current trajectory 620 to continue traveling on roadway 616 and may include potential trajectories such as potential trajectory 625. As such, alternative routes are included in vehicle horizon 617.

Figure 7:
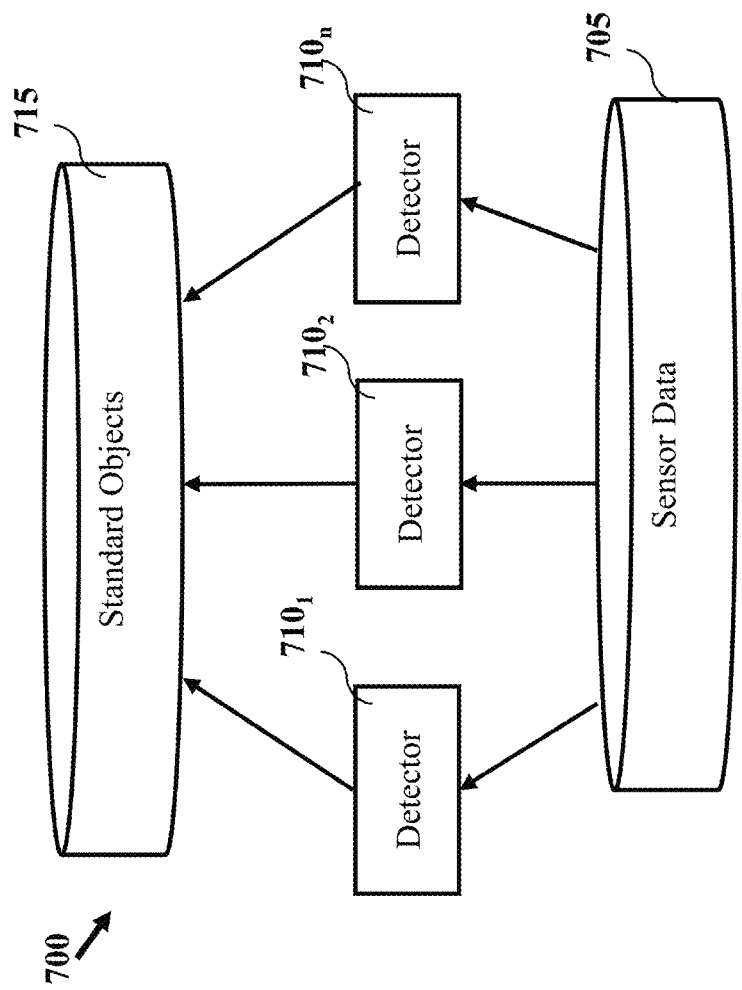
FIG. 7 depicts a graphical representation of object handling according to one or more embodiments.

FIG. 7 depicts a graphical representation of object handling according to one or more embodiments. According to one embodiment, identification of objects (e.g., identifying objects at block 210) may include classification of objects. Process 700 may be employed by a control unit of a vehicle. According to one embodiment, sensor data 705 is detected by a vehicle. Sensor data may be generated by one or more sources of a vehicle, such as an imaging device, (e.g., camera) and sensing device (e.g., LiDar). The control unit of the vehicle includes a plurality of detectors $710_{1-n}$ configured to identify objects and classify objects into one or more categories of standard objects 715.

Figure 8:
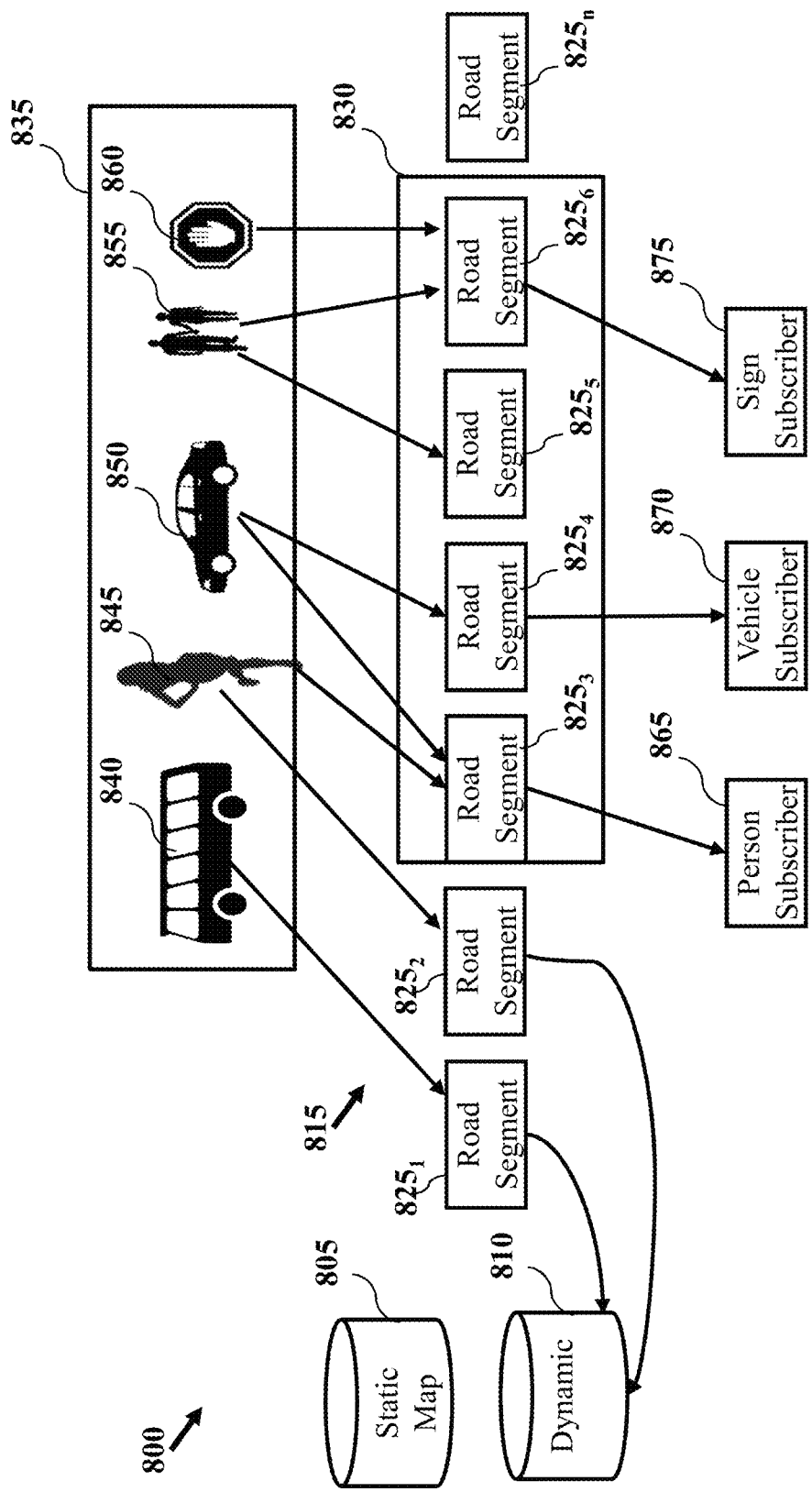
FIG. 8 depicts a graphical representation of assigning objects to road segments according to one or more embodiments.

FIG. 8 depicts a graphical representation of assigning objects to road segments according to one or more embodiments. Process 800 may be employed by a vehicle, such as a vehicle control unit. Identified objects may be stored by a control unit in static map 805 and dynamic map 810. According to one embodiment, all objects identified by a control unit as being associated with a vehicle horizon are assigned to one or more road segment. A vehicle may maintain at least two reference lists including a list of all objects and a list of segments. The segment list may be divided into segments of interest, such as segments of the vehicle horizon, and other segments. According to one embodiment, static map 805 may be configured to store the list of objects and segments.

Static map 805 includes static objects (e.g., non-movable objects) such as roadway divisions, sign posts, etc. Dynamic map 810 stores objects which are movable, such as other vehicles, pedestrians, animals, etc. Dynamic map 810 may be configured to store segments and include data elements associated with objects assigned to the segments. In one embodiment, a vehicle control unit can update the list of segments and remove/update objects in response when the vehicle horizon is updated and/or object location are determined. In certain embodiments, objects that cannot be attached to any segment may be assigned to a category or list such as a special segment (e.g., a vacuum segment). Objects may remain associated and/or stored in the special segment as long as they are detected to avoid reprocessing objects that have previously been sensed.

According to one embodiment, a vehicle horizon may be determined and segments of roadways may be determined. FIG. 8 shows a roadway network 815 divided into segments $825_{1-n}$ with vehicle horizon shown as 830. Detected objects 835 include objects of one or more classes. According to an exemplary embodiment, bus 840, person 845, vehicle 850, pedestrians 855 and sign 860 are objects detected by a vehicle and assigned to one or more segments. Some of the objects are assigned to segments in the vehicle horizon 830, while others are assigned to segments not associated with the vehicle horizon. According to another embodiment, objects may be assigned to more than one segment. By way of example, vehicle 850 is assigned to segments $825_3$ and $825_4$. Objects may be assigned based on the object trajectory, such as object speed and direction. Objects may be attached to more than one road segment if the ego-vehicle cannot initially determine which segment the object belongs to. In one embodiment, a vehicle control unit performs a map matching operation to determine the possible segments to which an object may belong based on an initial estimated of location.

According to one embodiment, segments may then be tagged or classified as including an object. By way of example, road segment $825_3$ may be stored as a data element to identify the presence of a person, such as person subscriber 865. Similarly, road segments $825_4$ and $825_5$ may be stored as data elements to identify the presence of a vehicle, such as vehicle subscriber 870, and to identify the presence of a sign, such as sign subscriber 875.

Figure 9:
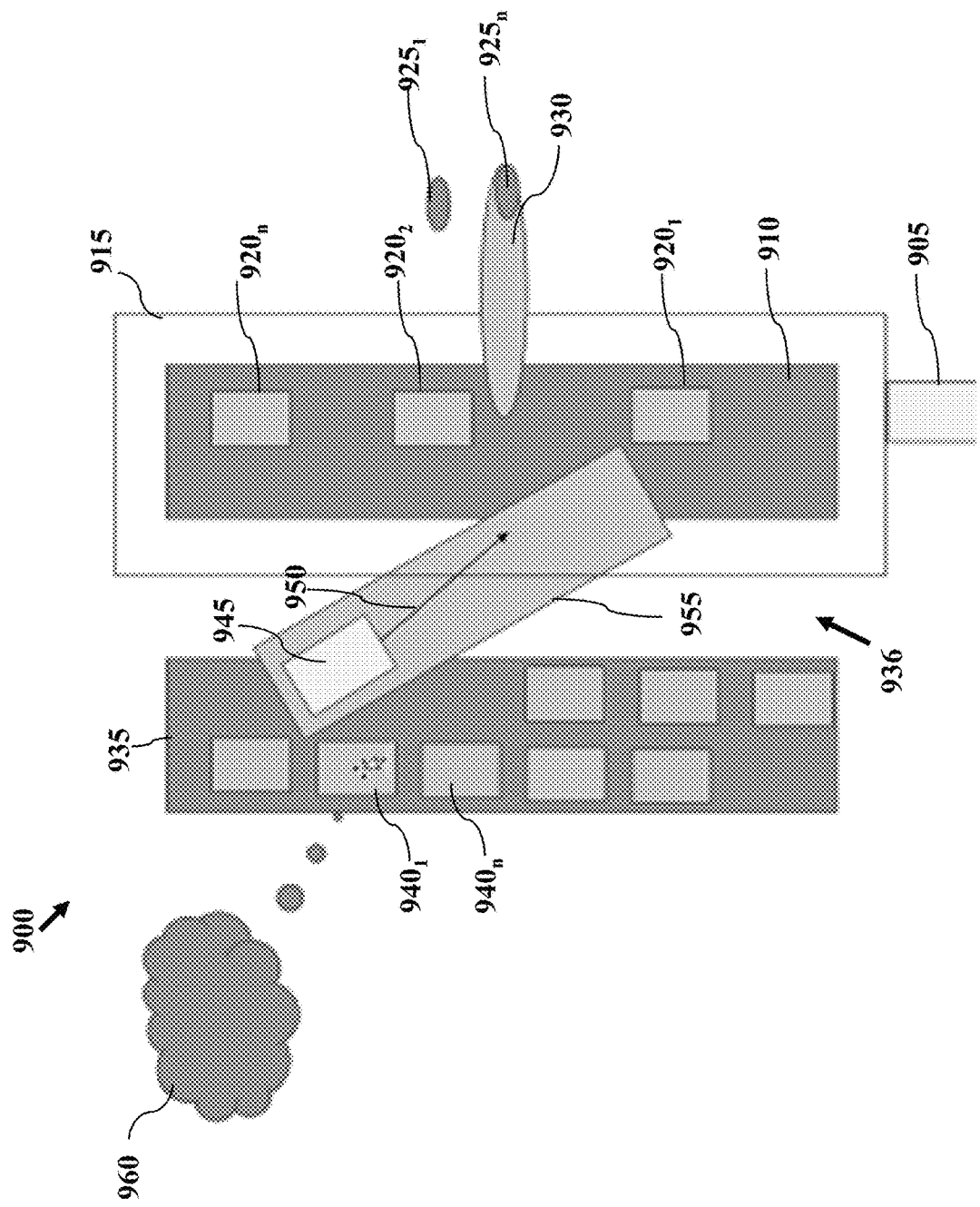
FIG. 9 depicts a graphical representation of contextualizing objects according to one or more embodiments.

FIG. 9 depicts a graphical representation of contextualizing objects according to one or more embodiments. FIG. 9 shows vehicle 905 traveling on roadway 910. According to one embodiment, the vehicle is configured to determine a vehicle horizon shown as 915 relative to vehicle roadway 910. According to another embodiment, vehicle 905 is configured to identify one or more objects, such as objects $920_{1-n}$ located on roadway 910, and one or more other objects such as objects $925_{1-n}$ that are not located on roadway 910. In certain embodiments the sensors of vehicle 905 may also detect objects associated with roadway 935 located near roadway 910 including objects 9401-$n$. Roadway 935 may be separated by area 936 from roadway 910.

According to one embodiment, vehicle 905 may be configured to assign objects to one or more segments of a roadway. By way of example objects $920_{1-n}$ may relate to vehicles on roadway 910 and may be assigned to one or more segments of roadway 910. According to another embodiment, vehicle 905 may be configured to determine and/o estimate object trajectory or travel. Objects $925_{1-n}$ relate to objects that are not traveling on the road but that may be detected by the vehicle. In certain embodiments, vehicle 905 and one or more sensors of the vehicle may be configured to detect object motion and assign the object to a segment of a roadway associated with vehicle horizon 915 based on the object motion. In an exemplary embodiment, objects $925_{1-n}$ may relate to movable objects, for example deer, where object 925 is stationary and object $925_n$ is moving towards roadway 910. Vehicle 905 may determine that object 925 is stationary and not assign object 9251 to roadway 910. Vehicle 905 may be configured to determine trajectory 930 for object 925$n$ and assign object 925$n$ to roadway 910 based on trajectory 930.

In one embodiment, object trajectory may be used to determine whether an object is assigned to a roadway segment of the vehicle horizon. Vehicle 905 may be configured to evaluate trajectory 930 in order to determine the assignment of object $925_n$ to vehicle horizon 915. According to another embodiment, monitoring objects assigned to the vehicle horizon may be based on assigned objects and sensor data providing object trajectory. As such, object 925$n$ may be assigned to a roadway segment based on trajectory 930 even though object 930 is not on a defined roadway or roadway that intersects with roadway 910.

FIG. 9 also shows another example of object trajectory where an object outside of a vehicle horizon may be added or assigned to a segment of the vehicle horizon of vehicle 905. Vehicle 945 may be traveling on roadway 935 and proceed in direction 950 towards roadway 910. According to one embodiment, vehicle 905 may be configured to identify trajectory 955 for vehicle 945 and assign vehicle 945 to a segment of vehicle horizon 915. As such, vehicle 905 can monitor operation of vehicle 945. Other vehicle on roadway 935, such as vehicles 9401-$n$ may not be added to the vehicle horizon by vehicle 905.

FIG. 9 also depicts a graphical representation of sharing object information. According to one embodiment, vehicles may be configured to exchange object detection information relative to each vehicle. In a vehicle-to-vehicle (V2V) system, vehicle 905 may receive, and or share, object data from other vehicles in close proximity. As such, vehicle 905 may be configured to share detection of object 925$n$ and at least one of object trajectory and a roadway segment assigned to the object with one or more other vehicles. Similarly, vehicles on roadway 935, such as vehicle 940$_1$ can share detected objects with other vehicle. In certain embodiments, one or more vehicles may be configured to operation in a vehicle to infrastructure configuration (V2I) such that a vehicle may share object data with a network entity. FIG. 9 shows vehicle 940$_1$ having a network connection with network 960 which may provide object data to the vehicle.

Figure 10:
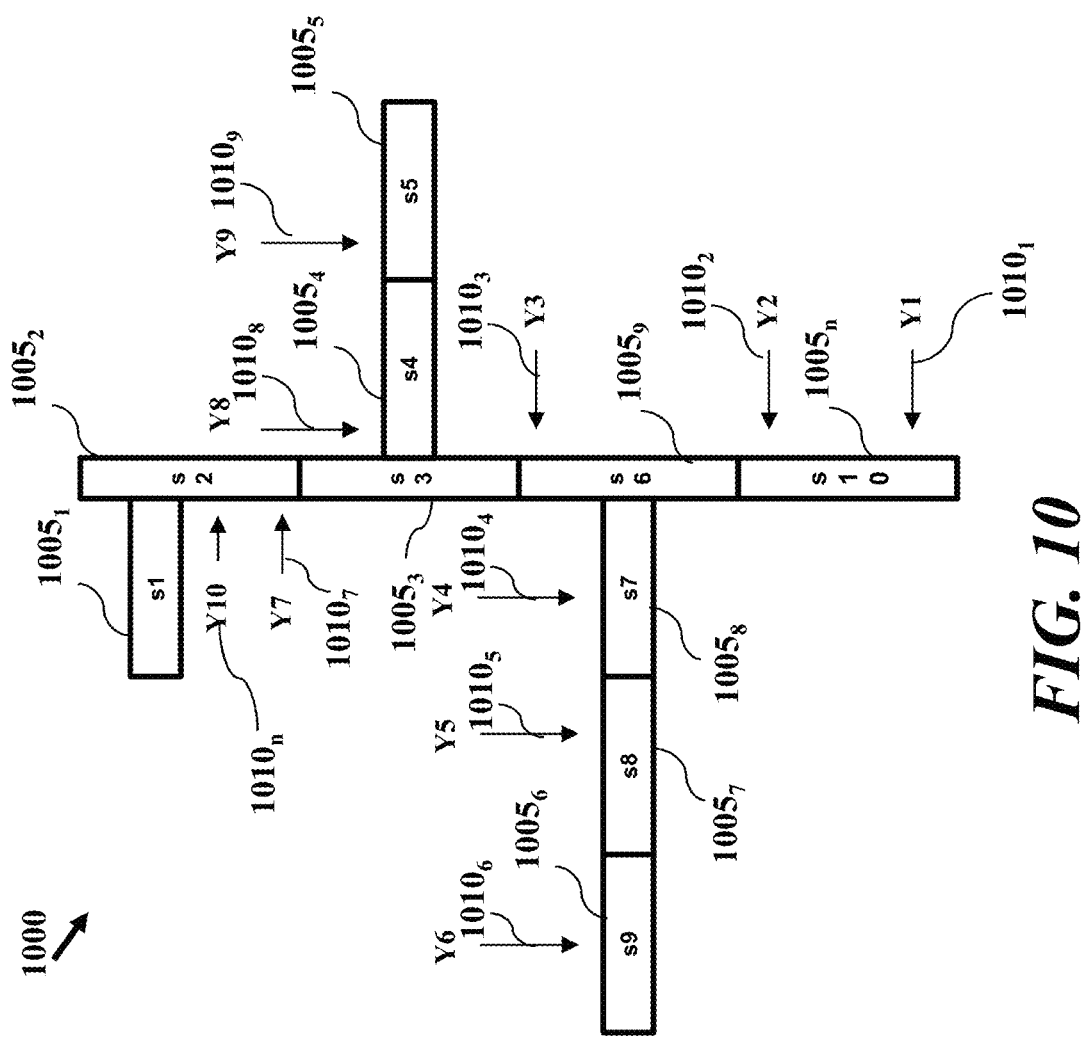
FIG. 10 depicts a graphical representation of a vehicle horizon according to one or more embodiments.

FIG. 10 depicts a graphical representation of a vehicle horizon according to one or more embodiments. As discussed above, a vehicle horizon may be configured to handle moving objects. In contrast to an electronic horizon that only accounts for non-moving objects, a vehicle horizon according to the disclosure can enhance a vehicles performance with respect to moving and stationary objects. Similarly, a vehicle horizon of the disclosure can enhance vehicle performance with respect to a current roadway, potential roadways and roadways that may intersect with a vehicle in contrast to an electronic horizon that only accounts for roadways ahead of a vehicle.

According to one embodiment, vehicle horizon 1000 in FIG. 10 is an exemplary horizon that includes road segments s1-s10 labeled 1005$_{1-n}$ and positions Y1-Y10 labeled 1010$_{1-n}$. Vehicle horizon 1000 may be determined based on roadway topography and a buffer distance to allow a vehicle to stop. In an exemplary embodiment, the flow of traffic may proceed towards a decreasing segment number. As such, if a vehicle is in position Y1 1010$_1$, based on the vehicle's current speed and assuming it will follow the max speed of all following segments, then, if the vehicle decided to stop immediately after a buffer distance, the vehicle would end up located at either Y7, Y8 or Y4 according to the current stopping rate setting. In this scenario, the speed limit in s4 and s7 is much lower than the speed limits in s10, s6 and s3 because the travel distance is shorter. It can be said then, that at location Y1, the electronic horizon of the ego vehicle would include s10, s6, s3, s2, s4 and s7. In FIG. 10, although segments s4 and s7 have an opposite direction of travel for the traffic, in other words, the ego-vehicle would not actually travel into s7 ever, it may be assumed in this exemplary embodiment that the vehicle would in order to simplify the calculation over assuming multiple vehicles (one traveling on s4 and one traveling on s7). Accordingly, FIG. 10 provides an example of identifying a vehicle horizon.

According to another embodiment, vehicle horizon may account for a roadway sections that approach or interest with a vehicle relate to a reverse direction of travel. As such the vehicle horizon may include both a forward and reverse horizon. The vehicle horizon may be determined by including segments in directions opposite to or leading up to a vehicles direction of travel. With respect to FIG. 10, assuming a vehicle flipped around (e.g., a reverse direction of travel) and all segments that would be included in the extended horizon if that direction of travel in the reversed direction are to be included in the vehicle horizon as an extended direction of travel.

According to one embodiment, the vehicle horizon may include both a forward horizon and a reverse horizon, such that a stopping distance of the vehicle may be different for setting horizon length when in each horizon direction. By way of example, referring to FIG. 10 and assuming that the vehicle is in location Y3 and that the stopping locations in the direction of forward travel are Y10, Y9 and Y5, the forward horizon includes segments s6, s3, s2, s4, s5, s7 and s8. For the reverse horizon, a reverse view (e.g., if the car was theoretically flipped around and it followed the speed limit multiplied by a safety factor) of all segments in the reverse direction with complete disregard of the direction of travel of any segment, the vehicle would stop immediately after a buffer distance. Then, assuming the vehicle would come to a stop either location Y2 or Y4 (based on a stopping distance in reverse can be set different from forward), then the "reverse horizon" would include segments s6, s10 and s7. The total extended horizon includes both the forward and reverse horizon.

Figure 11B:
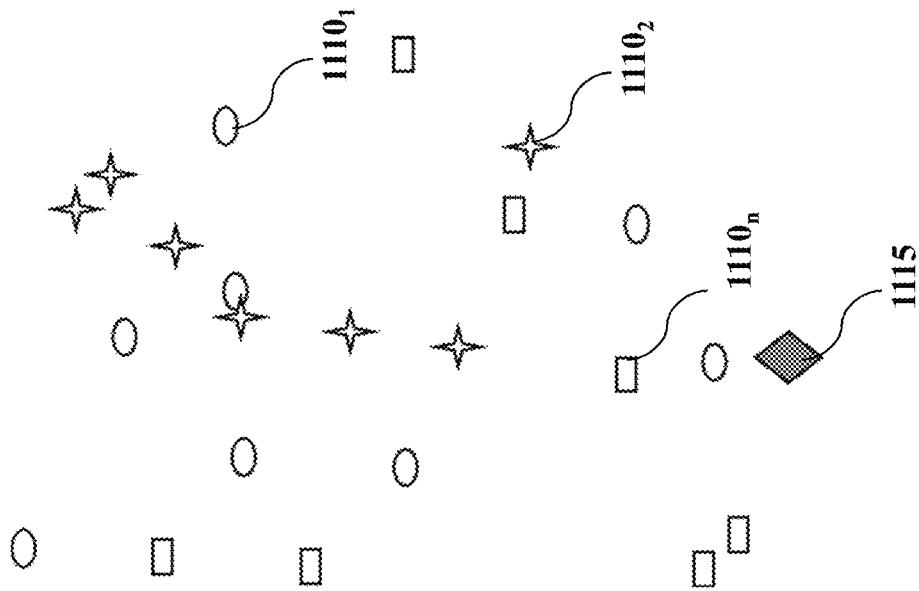
FIG. 11A-11D depict graphical representations of contextualizing objects according to one or more embodiments.
Figure 11A:
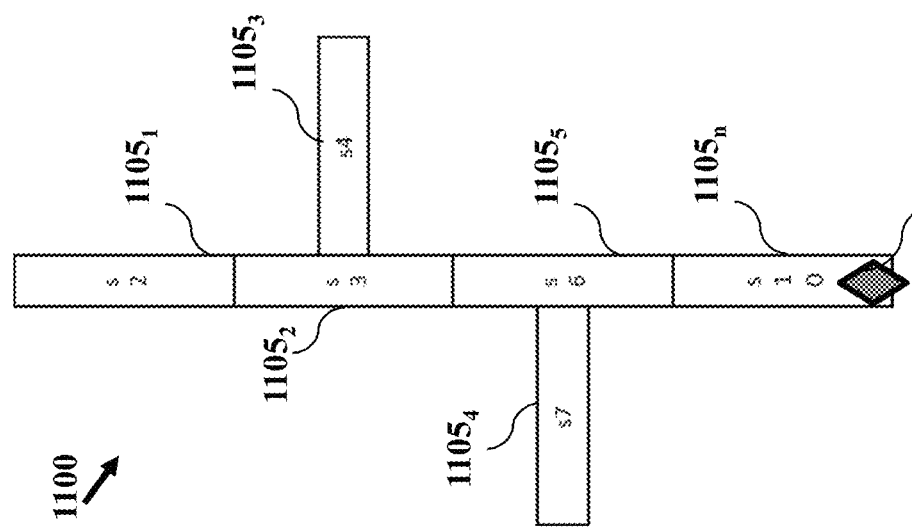

FIG. 11A-11D depict graphical representations of contextualizing objects according to one or more embodiments. FIG. 11A depicts a graphical representation of a roadway topography 1100 including roadway segments 1105$_{1-n}$. Contextualizing objects to roadway topography 1100 allows for the number of objects that an ego-vehicle needs to care about to be limited. FIG. 11A depicts the ego vehicle associated with the roadway topography 1100 as vehicle 1110. FIG. 11B depicts one or more objects that may be detected by vehicle 1100. Vehicle 1115 may detect objects 1110$_{1-n}$ of different types or classifications.

Figures 11C, 11D:
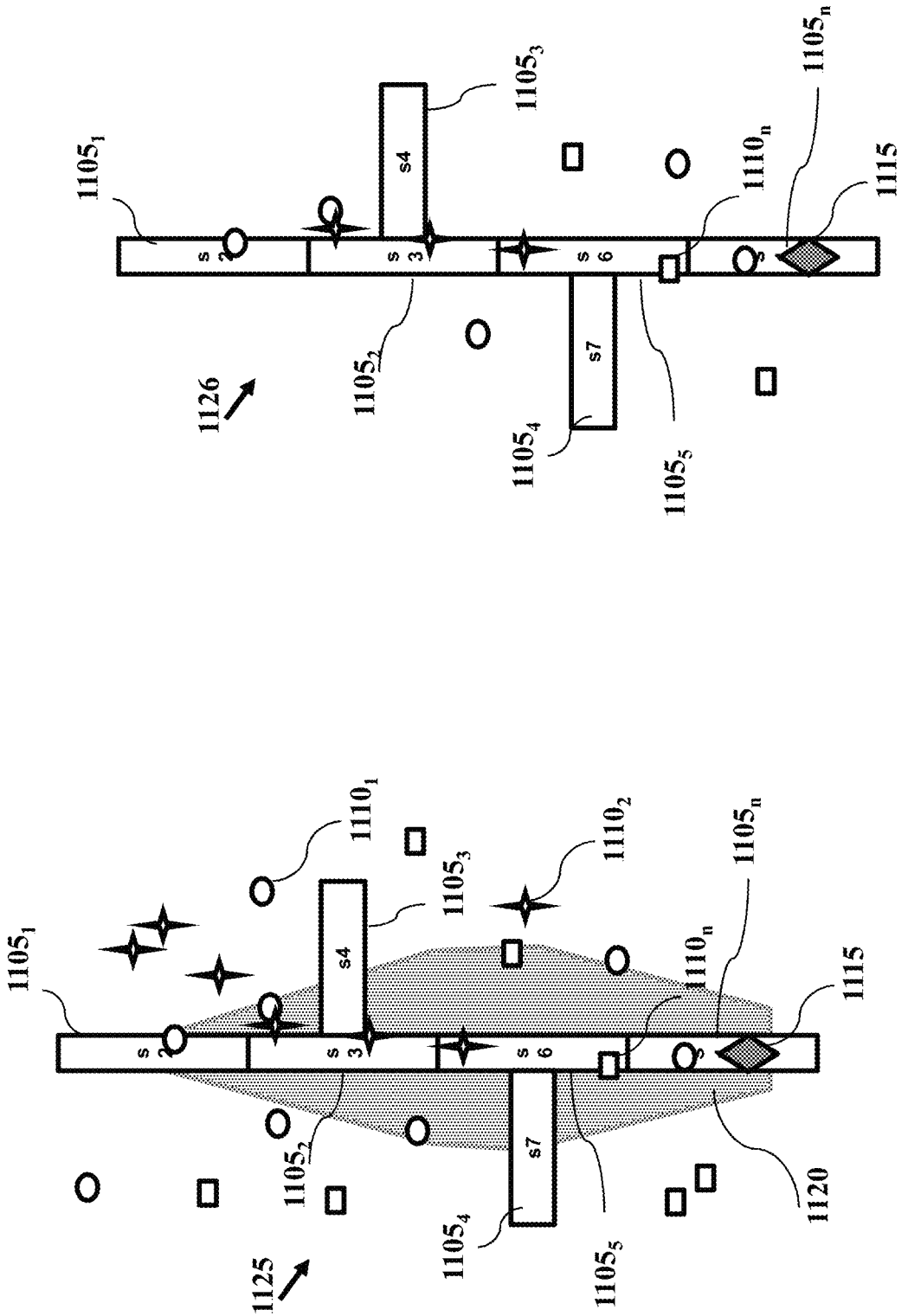

FIG. 11C depicts objects 1110$_{1-n}$ overlaid onto roadway topography 1100 and vehicle horizon 1120 for vehicle 1115. Vehicle horizon 1120 is shown as an area of interest having a multiple sided shape that includes a plurality of segments 1105$_{1-n}$ and an area extending beyond the roadway segment area. It should be appreciated that other vehicle horizon shapes may be employed. The vehicle horizon 1120 may be identified as having an area of interest around the roadway segments of an electronic horizon can be chosen in one or more ways. In one embodiment, the shape of vehicle horizon 1120 is object independent and determined based on a distance to the electronic horizon. In this embodiment, the vehicle horizon 1120 may account for the distance to the ego-vehicle and its future speed. Moreover, in this example, the area of interest may be zero where the vehicle comes to a stop.

In one embodiment, the shape of vehicle horizon 1120 is object dependent such that the shape is based on the distance it would take a particular object to enter the area of interest. The object dependent version requires the object to first be identified. If an object can be received or detected generically, with little resource usage, and then discarded as irrelevant, then resources may be maintained. When there are hard barriers, such as a body of water (e.g., lake, river, etc.), a concrete divider, or vehicle is driving over a bridge, then the area of interest can be further reduced.

In FIG. 11C, the identified objects 1125 include objects associated with a vehicle horizon 1120 and outside of vehicle horizon 1120. According to one embodiment, objects may be selected or filtered from identified objects 1125. Identified objects 1125 are perceivable by vehicle 1115. However, not all objects are of consequence or worth considering for vehicle 1115. In one embodiment, the likelihood that an object will interfere with operation of vehicle 1115 may be the basis for assigning the object to a segment. Not all identified objects can or will interfere with vehicle 1115, nor can vehicle 1115 interfere with all the objects.

Unlike a usual approach to use a distance from vehicle 1115, processes and configurations discussed herein allow for considering the current and potential positions of the vehicle, as well as the current and potential positions of the objects.

FIG. 11D depicts a filtered set 1126 of identified objects 1125 including object assignment to one r or more roadway segments. In FIG. 11D, filtered set 1126 reduces the number of identified objects 1125 such as from 22 to 9 by contextualizing to the road topography and based on a road horizon. It should be appreciated that multiple types of road horizon may be employed as long as the vehicle horizon accounts for the mutual effect of the vehicle and detected objects. Traditional approaches to electronic horizons may not be very useful due to size of the horizon, inclusion of too many objects, and an inability to consider stopping distances.

Figure 12:
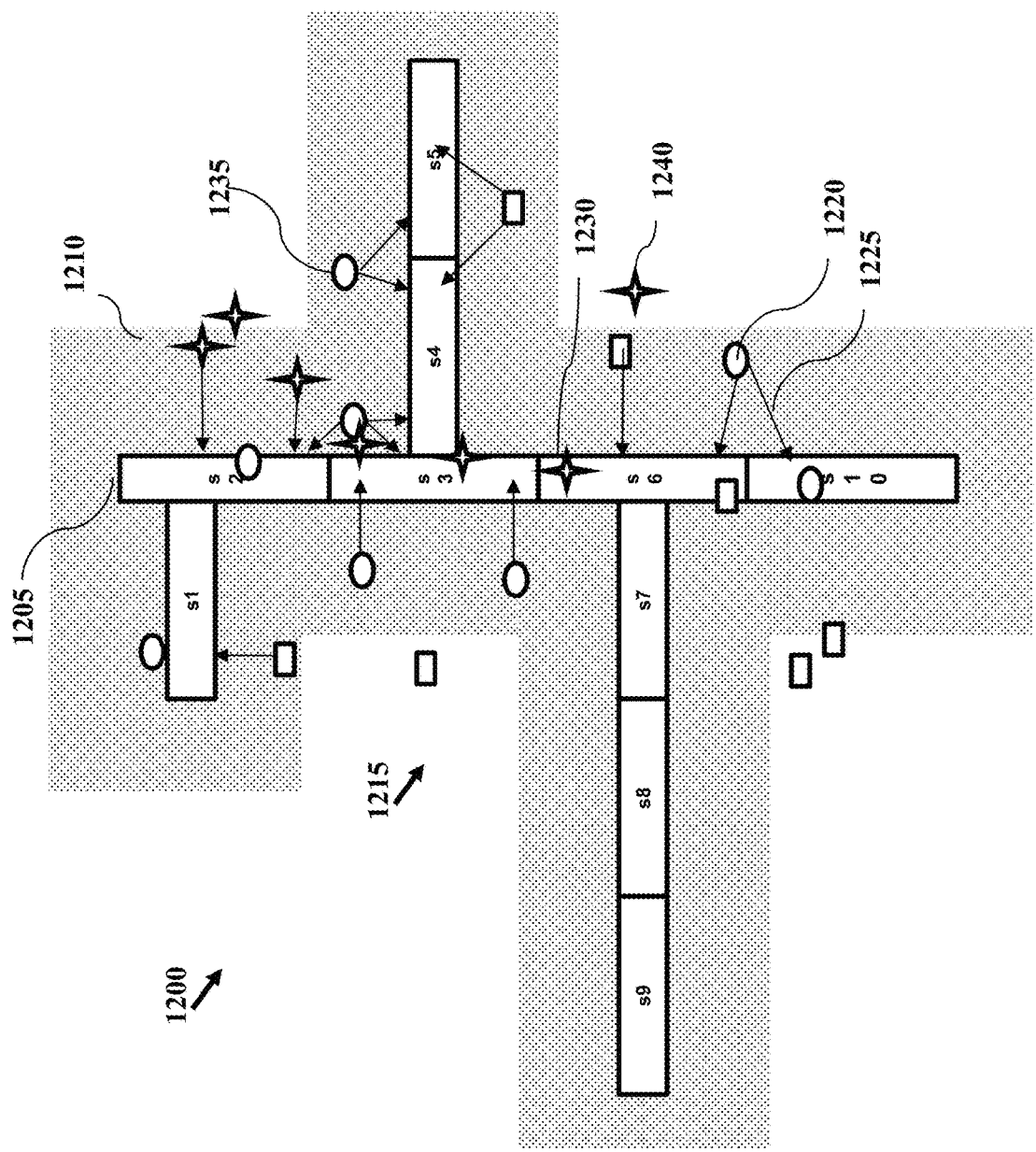
FIG. 12 depicts a graphical representation of assigning objects to segments according to one or more embodiments.

FIG. 12 depicts a graphical representation of assigning objects to segments according to one or more embodiments. While FIGS. 11A-11D can create a subset of objects that are important to one particular electronic horizon, FIG. 12 illustrates how resources may be reduced by assigning objects to segments of a roadway, in contrast to an electronic horizon. FIG. 12 depicts a graphical representation of a roadway topography 1200 including roadway segments 1205 and vehicle horizon 1215 area of interest 1210. According to one embodiment, identification of objects may include assigning each object to a road segment. FIG. 12 illustrates assignment of object 1220 segments s6 and s10 based on trajectory 1125 of object 1220. In FIG. 12, all the objects are assigned to road segments. Objects in FIG. 12 may be moving objects. Some objects such as object 1230, are on a particular segment, and thus, assignment to a segment is based on object location or position. Some objects, such as object 1235, are on the area of interest, and can be assigned to one or more segment. Some objects, such as object 1240, are outside the area of interest and are assigned to a void segment, as the objects may be irrelevant in the current situation. If objects move, they may become relevant.

According to one embodiment, areas of interest 1210 in vehicle horizon 1215 may not take in consideration a vehicle position and speed may be unknown, while velocity, trajectory and type of object can be used to include a particular object or not. For example, an object moving away from a segment could be ignored. In one embodiment, a list of segments may be stored and updated by a vehicle, such that attached to each segment is a list of all objects that are assigned to the segment. Once a listing or table has been created for vehicle use, with all segments and all objects assigned to these segments objects may be contextualized to the road segments. In certain embodiments, once an object is identified each object is assigned to a roadway segment. If the object moves and becomes proximate a different segment, the object may be reassigned to that new segment or shared among segments when the object cannot be clearly defined to which segment it belongs. In certain embodiments objects are assigned to segments prior to identification of a vehicle horizon. In other embodiments, objects are assigned after the vehicle horizon has been determined.

According to one embodiment, each vehicle, such as the ego vehicle, estimates an electronic horizon by evaluation the possible interactions of the ego-vehicle and objects. Once a vehicle horizon has been identified, and the list of segments that belong to the ego-horizon is known, the table of objects can be compared to segments to determine which objects are important to the ego vehicle. As the vehicle advances and the segments that conform the ego-horizon change, the objects that are of interest to the ego-vehicle will also be updated. Once the objects of interest, based only on the segments, have been determined, then a smart area of interest (e.g., area of interest 1120) which considers the vehicle current and future speed and the distance of objects to the road segment can further reduce the number of object.

FIG. 13 depicts a process for determining objects according to one or more embodiments. According to one embodiment, process 1300 provides operations to determine relevant objects for vehicle systems such as autonomously driven vehicles (e.g. on-road) and driver assistance systems such as advanced driver assistant systems (ADAS). Process 1300 may be employed by networked based services that provide data to vehicles. In one embodiment, objects are determined to be relevant or not based on the likelihood they will interact with a particular vehicle based on the roadways surrounding the vehicle.

According to one embodiment, process 1300 includes determining a vehicle horizon (e.g., electronic horizon) based on roadways of interest to a particular vehicle. A "shape" may be determined which approximately conforms to the shape of the roadways that conform the electronic horizon. Objects may be identified at block 1310 using the shape determined at block 1305. In one embodiment, all objects that have had already been detected and the "shape" is used as a "cookie cutter" to select only those objects that fit within the "shape". In certain embodiments, it may not be necessary to assign an object to a roadway segment since objects are determined relevant as the horizon (or shape around it) is being created. According to another embodiment, as the objects are detected they are determined to be within the "shape" or not. Process 1300 thus allows for using a shape created around a vehicle electronic horizon to selectively mark objects as more relevant. Process 1300 may be performed in a vehicle or by way of a network resource (e.g., in the cloud). Network based determinations of objects with respect to a roadway or map data may be used for selecting which objects the cloud sends to each particular vehicle, such as a V2X operation.

According to one embodiment, a network entity or system may employ process 1300 to identify relevant objects. When employed in a network system (e.g., system 400 of FIG. 4), many cars send many objects to the network system, often randomly and in a disordered fashion. Process 1300 may be employed to determine which objects are repeated, keeping only one instance of each object even if the same object was reported by multiple vehicles at block 1310. The network system can then generate an individual electronic horizon for each vehicles independently. With the electronic horizon generated at block 1305, the system can implement a "shape" for each individual vehicle to determine the list of objects of interest at block 1310. A determined list of objects may be communicated to each vehicle. As a result, irrelevant objects are not transmitted, saving the network communication bandwidth as well as processing power on each vehicle.

FIG. 14 depicts a process for assigning objects according to one or more embodiments. According to one embodiment, process 1400 may assign objects for vehicle systems such as autonomously driven vehicles (e.g. on-road) and driver assistance systems such as advanced driver assistant systems (ADAS). Process 1400 may be employed by networked based services that provide data to vehicles. Process 1400 may be performed to assign each object to a road segment independent of how a set of objects has been perceived, Process 1400 may be employed for one or more objects (e.g., not necessarily identified), to determine if the object can be associated to at least one roadway segment. Each roadway segment may be held by a fixed or temporary database (typically a map database).

Process 1400 may include determining the proximity of an object to at least one road segment at block 1405. According to one embodiment, process 1400 may be performed starting with objects that are not yet determined to be relevant. At block 1410, process 1400 includes determining whether the object is assignable to a road segment. Each object may be associated with a roadway segment by estimating a future position of the object and the objects proximity to a roadway segment. The type of object may also be considered determine a typical pattern of behavior. Multiple objects may be considered with respect to determining object behavior. For example, when a second object is associated, at least temporarily, with a particular roadway segment due to its possible connection to a first object (e.g., a ball seen rolling on a road, where although the ball has already rolled off the road, a "child object" is temporarily placed on the road as it is typical for a child to follow a ball).

Process 1400 may include updating one or more road segments of a vehicle horizon at block 1415. Updating at block 1415 may be iteratively performed for roadway segments belonging to an electronic horizon for a vehicle and to generate a list of roadway segments for a vehicle. Based on this list of roadway segments, all objects associated with the vehicle horizon may be prioritized in subsequent system calculations or estimations. As such, objects may be considered when relevant based on an identified list of roadway segments. According to one embodiment, a network entity or system may employ process 1400 to assign a segment identification to objects. As vehicle horizons are generated for each vehicle, the network system can find the objects that belong to the segments that are included in the vehicle horizons.

According to another embodiment, process 1400 may be used with different map suppliers. With multiple suppliers of map databases, not all roadways are divided into the same segments, nor do the map suppliers identify roads in the same way. Thus, when a network service creates an electronic horizon for a particular vehicle, and using this electronic horizon then finds the objects of relevance to that vehicle, configurations discussed herein allow for the list of objects to be provided (including location) with or without roadway segments named. The vehicle can be assigned objects to segments used by the vehicle. In an exemplary embodiment, an object may be associated with segment "ABC" by the network resources, but then associated with segment "45A" in the vehicle.

While this disclosure has been particularly shown and described with references to exemplary embodiments thereof, it will be understood by those skilled in the art that various changes in form and details may be made therein without departing from the scope of the claimed embodiments.

What is claimed is:

1. A method for contextualizing objects relative to a vehicle horizon, the method comprising:
   identifying, by a control unit of a vehicle, the vehicle horizon based on the vehicle trajectory and roadway data relative to the position of the vehicle, wherein identifying the vehicle horizon includes determining at least one roadway segment based on the roadway data and vehicle trajectory;
   identifying, by the control unit, at least one object relative to the vehicle;
   assigning, by the control unit, the at least one object identified by the control unit to the at least one roadway segment, wherein each object assigned to a roadway segment is assigned based on the vehicle horizon, and wherein assigning the at least one object identified by the control unit to the at least one roadway segment is based on a linear distance that is determined using a stopping distance for the vehicle that takes into account one or more speed limits and one or more planned speeds on the at least one roadway segment;
   monitoring, by the control unit, each object assigned to a roadway segment associated with the vehicle horizon; and at least one of:
     presenting to a vehicle operator, by the control unit, an alert based on the assigning of the at least one object identified by the control unit to the at least one roadway, the alert including at least one of a warning indicator and a graphical element presented; and
     controlling, by the control unit, a vehicle operation relative to the at least one object.

2. The method of claim 1, wherein the vehicle horizon relates to a current roadway of the vehicle and roadway path relative to the current roadway within a predefined area of the vehicle and based on the vehicle trajectory.

3. The method of claim 1, wherein each of the at least one roadway segments relates to a section of a roadway identified by the control unit, and wherein each of the at least one roadway segments is determined based on vehicle operating characteristics.

4. The method of claim 1, wherein the vehicle horizon is determined based on a forward looking trajectory of the vehicle for a current roadway and roadways that merge into the current roadway.

5. The method of claim 1, wherein the vehicle horizon is determined based on a forward looking trajectory of the vehicle and for intersecting roadway paths approaching the vehicle.

6. The method of claim 1, wherein identifying the at least one object includes detecting the at least one object by a sensor of the vehicle, wherein object location is detected relative to the vehicle.

7. The method of claim 1, wherein identifying the at least one object includes receiving the at least one object from at least one of another vehicle and a communication network, wherein location data for the at least one object is received.

8. The method of claim 1, wherein assigning an object identified by the control unit to a roadway segment includes associating the object to a segment when the object is associated with the vehicle horizon of the vehicle.

9. The method of claim 1, wherein monitoring includes tracking object position for objects within the vehicle horizon.

10. A control unit of a vehicle comprising:
    a vehicle trajectory module configured to identify a vehicle horizon based on the vehicle trajectory and roadway data relative to the position of the vehicle, wherein identifying the vehicle horizon includes determining at least one roadway segment based on the roadway data and vehicle trajectory; and
    an object detection module configured to:
      identify at least one object relative to the vehicle;
      assign the at least one object identified by the control unit to the at least one roadway segment, wherein each object assigned to a roadway segment is assigned based on the vehicle horizon, and wherein assigning the at least one object identified by the control unit to the at least one roadway segment is based on a linear distance that is determined using a stopping distance for the vehicle that takes into account one or more speed limits and one or more planned speeds on the at least one roadway segment;

monitor each object assigned to a roadway segment associated with the vehicle horizon; and at least one of:

present to a vehicle operator, by the control unit, an alert based on the assigning of the at least one object identified by the control unit to the at least one roadway, the alert including at least one of a warning indicator and a graphical element presented; and control, by the control unit, a vehicle operation relative to the at least one object.

11. The control unit of claim 10, wherein the vehicle horizon relates to a current roadway of the vehicle and roadway path relative to the current roadway within a predefined area of the vehicle and based on the vehicle trajectory.

12. The control unit of claim 10, wherein each of the at least one roadway segments relates to a section of a roadway identified by the control unit, and wherein each of the at least one roadway segments is determined based on vehicle operating characteristics.

13. The control unit of claim 10, wherein the vehicle horizon is determined based on a forward looking trajectory of the vehicle for a current roadway and roadways that merge into the current roadway.

14. The control unit of claim 10, wherein the vehicle horizon is determined based on a forward looking trajectory of the vehicle and for intersecting roadway paths approaching the vehicle.

15. The control unit of claim 10, wherein identifying the at least one object includes detecting the at least one object by a sensor of the vehicle, wherein object location is detected relative to the vehicle.

16. The control unit of claim 10, wherein identifying the at least one object includes receiving the at least one object from at least one of another vehicle and a communication network, wherein location data for the at least one object is received.

17. The control unit of claim 10, wherein assigning an object identified by the control unit to a roadway segment includes associating the object to a segment when the object is associated with the vehicle horizon of the vehicle.

18. The control unit of claim 10, wherein monitoring includes tracking object position for objects within the vehicle horizon.

\* \* \* \* \*